ND
United States Patent [19]

Saruwatari et al.

[11] 4,187,895

[45] Feb. 12, 1980

[54] METHOD AND APPARATUS FOR AUTOMATICALLY ASSEMBLING SPOKED WHEELS

[76] Inventors: Teturo Saruwatari, 2 of 22, Shinsayama 2, Sayama-shi, Saitama-ken; Yositaka Mukai, 10 of 3243, Kaminanbata, Fujimishi, Santama-ken, both of Japan

[21] Appl. No.: 699,087

[22] Filed: Jun. 23, 1976

[30] Foreign Application Priority Data

Jun. 24, 1975 [JP] Japan ............................... 50-77783

[51] Int. Cl.² ............................................. B21K 1/34
[52] U.S. Cl. ................................................. 157/1.55
[58] Field of Search .............................. 157/1.5, 1.55

[56] References Cited

U.S. PATENT DOCUMENTS

| 2,463,350 | 3/1949 | Bonner | 157/1.5 |
| 3,620,281 | 11/1971 | Hasegawa et al. | 157/1.55 |
| 3,631,577 | 1/1972 | Hasegawa et al. | 157/1.5 |
| 3,758,931 | 9/1973 | Patterson | 157/1.5 UX |

Primary Examiner—James G. Smith
Attorney, Agent, or Firm—Fidelman, Wolffe & Waldron

[57] ABSTRACT

An apparatus for automatic assembly of spoked wheels which comprises in combination a mechanism to draw up spokes radially and horizontally on a hub, a mechanism to twill spokes, a mechanism for fastening spokes to a rim, and carrying mechanism to transport a partially completed wheel assembly between stages of assembly. Flexing of spokes permits insertion of spokes into spoke receiving holes in the rim. In an alternative embodiment, rotation of rim and spokes relative to the hub permits insertion of the spokes into spoke receiving holes in the rim.

7 Claims, 55 Drawing Figures

DRAWING UP • TWILLING • FASTENING

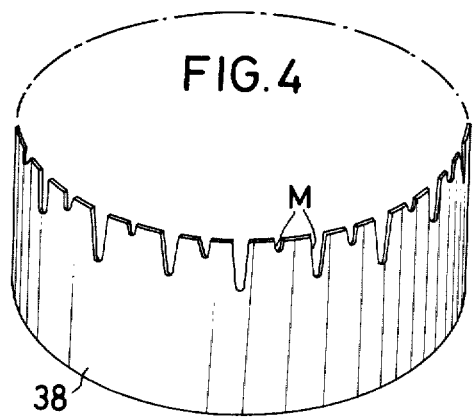
FIG.4
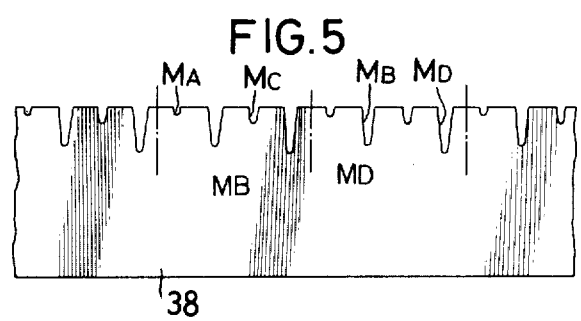
FIG.5
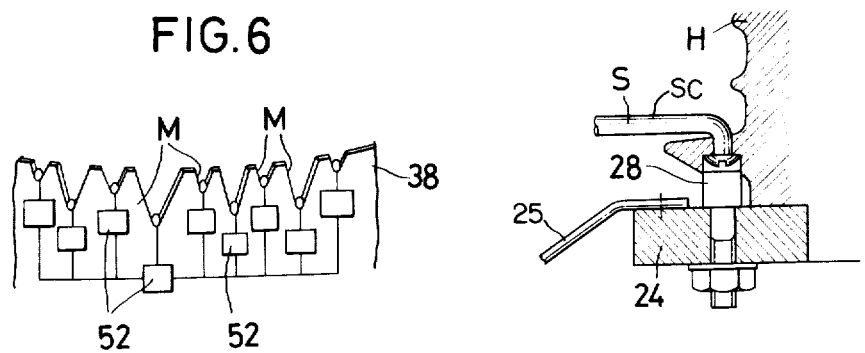
FIG.6
FIG.7

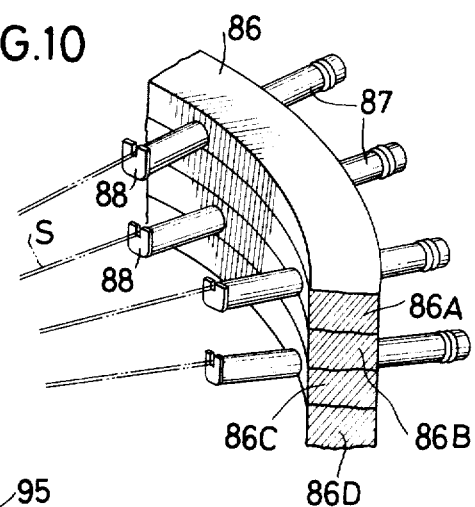
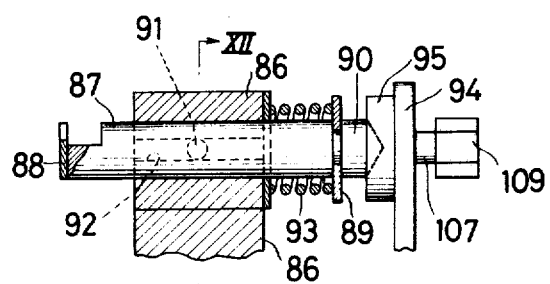
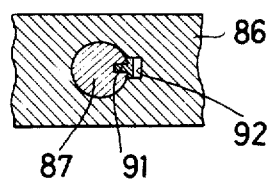
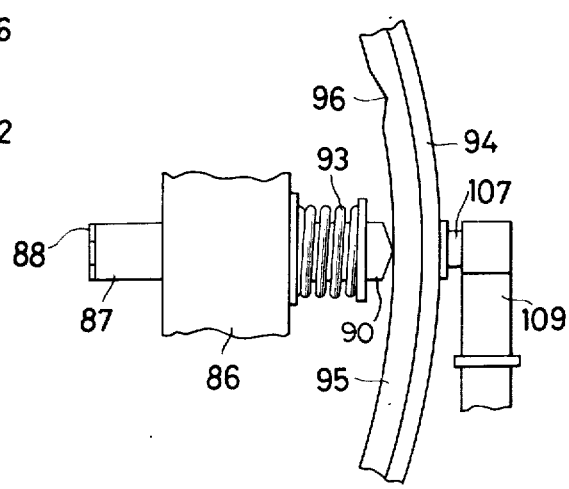

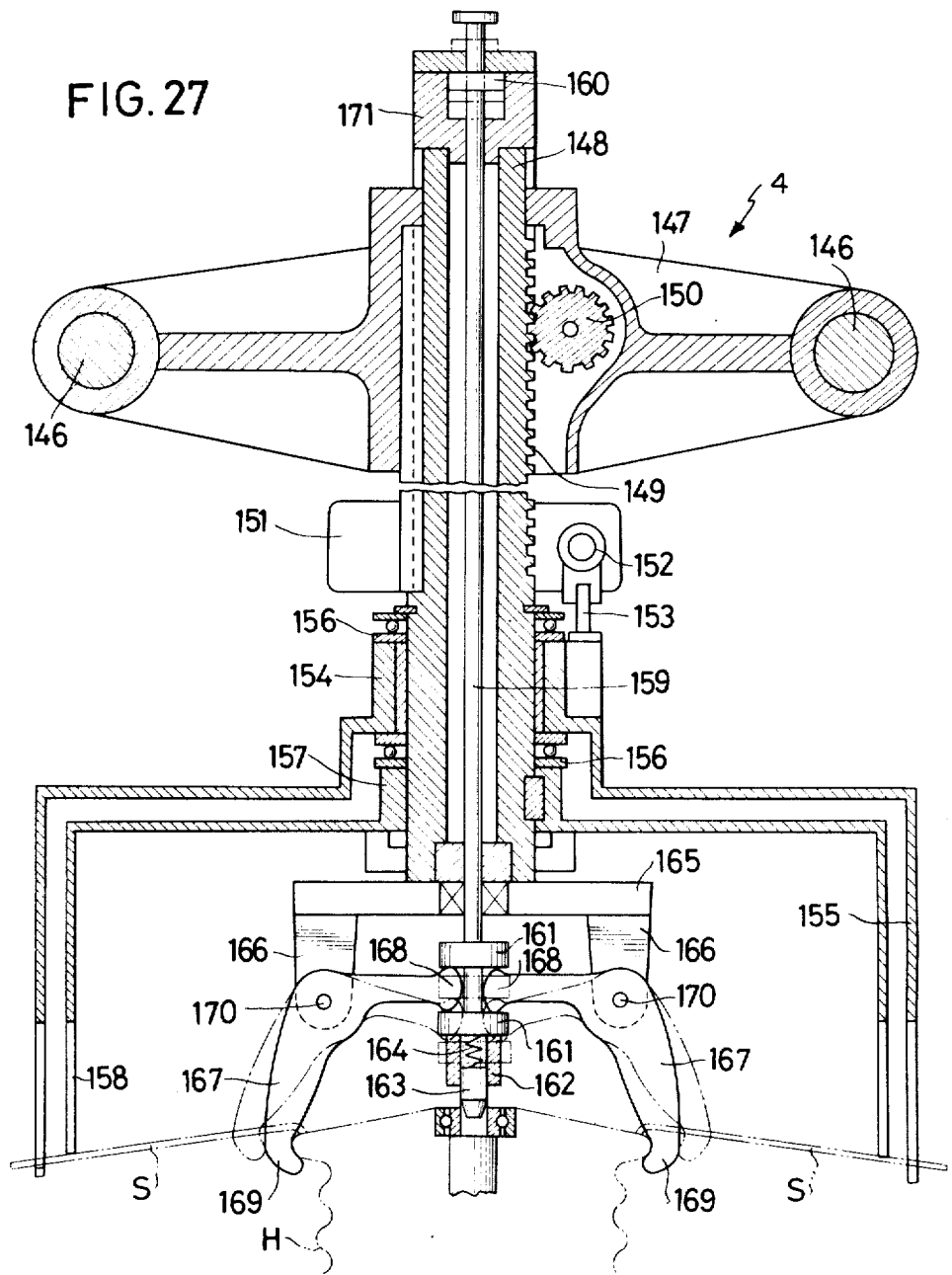

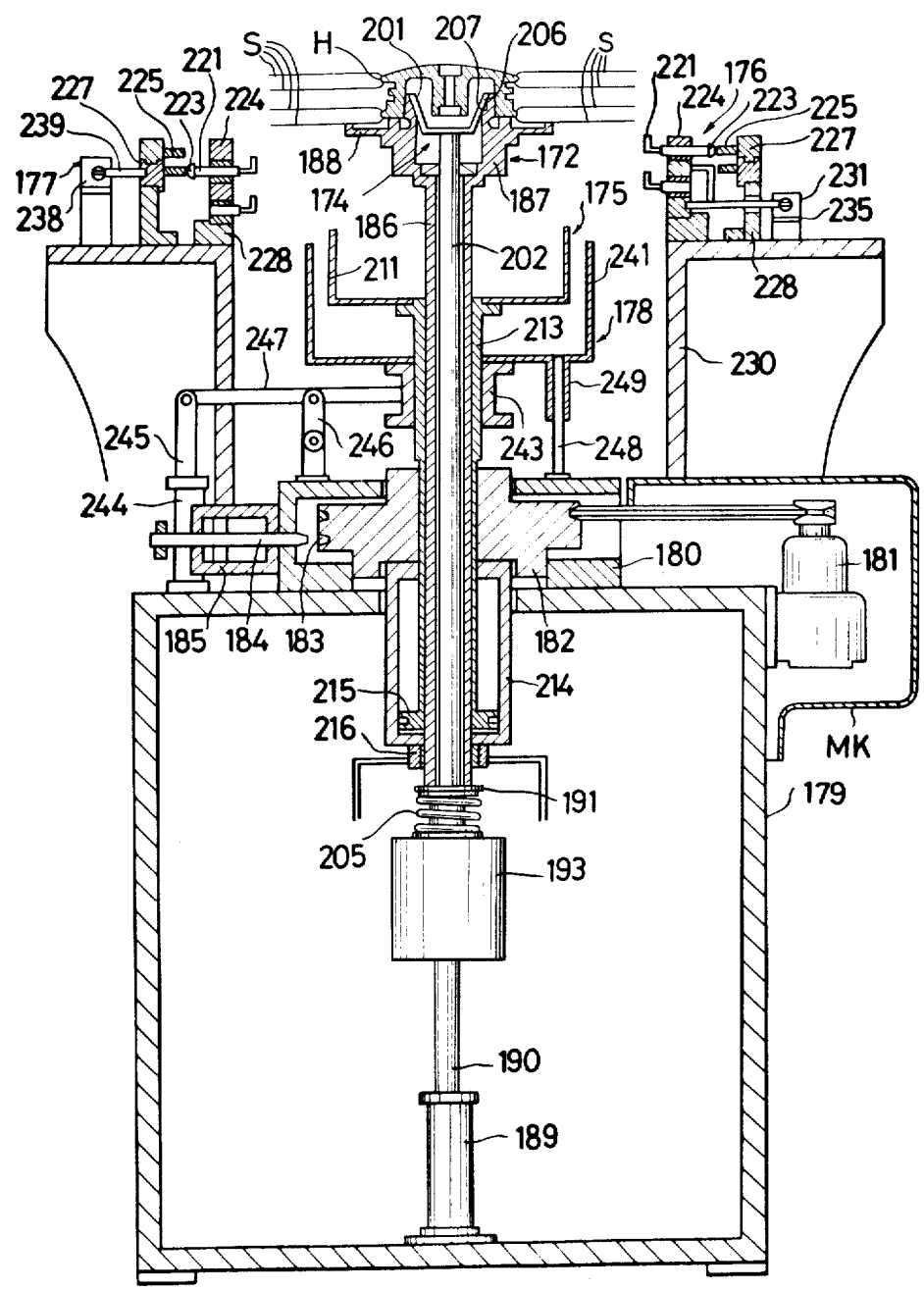

METHOD AND APPARATUS FOR AUTOMATICALLY ASSEMBLING SPOKED WHEELS

This invention relates to a method and apparatus for automatically assembling a wheel comprising a number of spokes, a hub and a rim, and apparatus to be used therefor.

In the past, a procedure has been employed to complete the assembly of a wheel, in which a multitude of spokes rotatably fitted about a hub are drawn up in a desired twilled posture, and each of spokes thus drawn up in the twilled posture is mounted on a rim by nipple-fastening, after which a tire is fitted thereto.

Particularly, the drawing up of the spokes in the twilled posture has been difficult to accomplish automatically such that in the prior art, an operator has to retain the spokes individually between his fingers to forcibly draw up and twill them and to simultaneously fasten and secure them to the wheel rim using nipples.

This manual procedure requires many steps and a high degree of skill because: the number of spokes is substantial; the positioning of all spokes relative to the hub is not identical and a special relationship exists between spokes; and a special sequence is required in attaching spokes to the rim.

The invention disclosed herein provides a fully automated system for assembling spoked wheels.

An object of the present invention is to provide an improved method for automatically assembling spoked wheels and apparatus to be used therefor.

The aforementioned object and other objects of the invention will become more apparent in the detailed description taken in connection with the accompanying drawings and in the appended claims. However, it is to be understood that the drawings are for the purpose of explanation only and not to limit the scope of the present invention.

FIGS. 2 through 7 illustrate the drawing-up mechanism wherein:

FIG. 2 is a front sectional view showing the retaining drum at a downward limit;

FIG. 3 is another front sectional view showing spokes radially drawn up and the retaining drum moved up;

FIG. 4 is a perspective view of the retaining drum showing the retaining grooves;

FIG. 5 is a developed front view of the retaining drum of FIG. 4;

FIG. 6 is a view showing sensitive switches mounted in the retaining drum of FIG. 4;

FIG. 7 is an enlarged sectional view of means for determining an angular position of a hub retained in the drawing-up mechanism;

FIGS. 8 through 23 illustrate the twilling mechanism wherein:

FIG. 8 is a front sectional view prior to upward movement of the retaining drum;

FIG. 9 is a front sectional view showing the retaining drum moved up with spokes assuming a final twilled posture;

FIG. 10 is a partial perspective view showing retainer pins fitted in a rotary ring;

FIGS. 11 and 12 illustrate the construction of retainer pins for spokes SA or SB in which:

FIG. 11 is a partial, radial section;

FIG. 12 is a sectional view taken along the line 12—12 of FIG. 11.

FIG. 13 is a plan view showing a positional relationship between the retainer pins of FIGS. 11 and 12 and a cam ring;

FIGS. 14 through 17 are developed schematic views showing the positional relationship between the retainer pins and the cam face in which:

FIG. 14 is a front view showing a positional relationship between the retaining pins mounted on different rotary rings;

FIG. 15 is a front view showing the position of the cam face with respect to the retainer pins positioned as shown in FIG. 14;

FIG. 16 is a view to a smaller scale showing a positional relationship between retainer pins and the cam face prior to twilling;

FIG. 17 is a view showing another positional relationship between retainer pins and the cam face after completion of twilling; FIG. 18 through 20 are plan views consecutively showing a twilling step in which:

FIG. 18 shows a state prior to twilling;

FIG. 19 shows a state after completion of twilling spokes in a horizontal posture;

FIG. 20 shows a state where the retainer pins are withdrawn to disengage spokes SA and SB from the retainer pins;

FIG. 21 is an enlarged detailed plan view of twilled spokes;

FIG. 22 is a perspective view of a retaining drum;

FIG. 23 is a developed front view of the drum of FIG. 22 showing the retaining grooves;

FIGS. 24 through 26 are views of the fastening mechanism wherein:

FIG. 24 is a front sectional view thereof;

FIG. 25 shows the end of a spoke received in a spoke receiving hole in the rim;

FIG. 26 is a front view of push-up members for elastic deformation of spokes;

FIGS. 27 through 29 are views showing the carrier mechanism wherein:

FIG. 27 is a sectional elevation showing the hub and retained spokes;

FIGS. 28 and 29 show the push plate and a hook for retaining the spokes wherein:

FIG. 28 is the push plate, hook and spoke prior to retaining the spoke;

FIG. 29 is the spoke retained by the push plate and hook;

FIGS. 30 through 47 illustrate an alternative embodiment for processing two steps, the drawing-up and twilling in the same station wherein:

FIGS. 30 through 33 are elevational sectional views in which:

FIG. 30 shows the condition of drawing-up;

FIG. 31 shows the condition of retaining spokes radially drawn up;

FIG. 32 shows the condition of twilling;

FIG. 33 shows the condition of twilling and retaining;

FIGS. 34 and 35 are enlarged elevational, sectional views showing the relationship between the main shaft and an installing and removing mechanism wherein:

FIG. 34 is a collect chuck securing the hub onto a mounting jig;

FIG. 35 is the hub not retained on the mounting jig;

FIG. 36 is an elevational sectional view of a coupling;

FIGS. 37 through 39 are enlarged views showing a spoke retainer pin mounted on a twilling ring and a cam ring in which:

FIG. 37 is a perspective view showing the spoke retaining pin fitting in the twilling ring;

FIG. 38 is another sectional view showing the spoke retainer pin fitting in the twilling ring;

FIG. 39 is a plan view showing a spoke retainer pin fitted in the cam ring;

FIGS. 40 and 41 illustrate a drawing-up drum in which:

FIG. 40 is a perspective view of a drawing-up drum;

FIG. 41 is a developed front view of the drawing-up drum of FIG. 40;

FIGS. 42 and 43 illustrate another twilling drum in which:

FIG. 42 is a perspective view of the other twilling drum;

FIG. 43 is a developed front view of the twilling drum of FIG. 42;

FIGS. 44 through 46 are partially cutaway plan views showing the twilling operating mechanism in various states of twilling spokes in which:

FIG. 44 shows a state prior to the twilling operation;

FIG. 45 shows a state after the twilling operation has been completed;

FIG. 46 shows a state with the spokes disengaged from the spoke retaining pin;

FIG. 47 is a plan view showing the posture of twilled spokes;

FIGS. 48 through 54 illustrate another alternative embodiment in which spokes are excessively inclined so that they may be readily inserted into spoke receiving holes in a rim wherein:

FIG. 48 is a sectional elevation view of the spoke inserting apparatus;

FIG. 49 is a plan view of the apparatus of FIG. 48;

FIG. 50 is a perspective view showing spokes retained by the retaining drums;

FIG. 51 is a perspective view showing a sliding ring connected to a rotary cylinder;

FIGS. 52 through 54 are sequential plan views showing insertion of the spokes into spoke receiving holes in which:

FIG. 52 is a sectional plan view prior to the insertion of spokes and showing a detailed construction of a reversible cylinder;

FIG. 53 shows a state where the rim and one set of spokes is received into the spoke receiving holes;

FIG. 54 shows a state where the rim and a retaining drum are rotated so that all spokes are inserted into the spoke receiving holes.

Figure 1A:
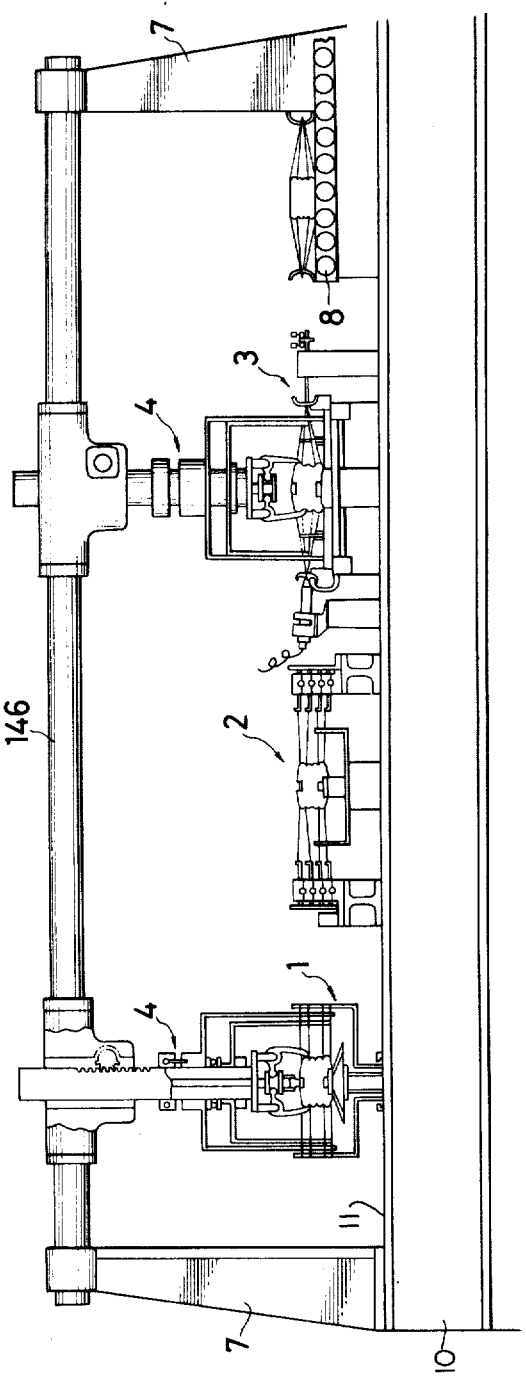
FIG. 1A is a schematic elevational view showing the positional relationship between various mechanisms employed in one embodiment of apparatus in accordance with the present invention.
Figure 1B:
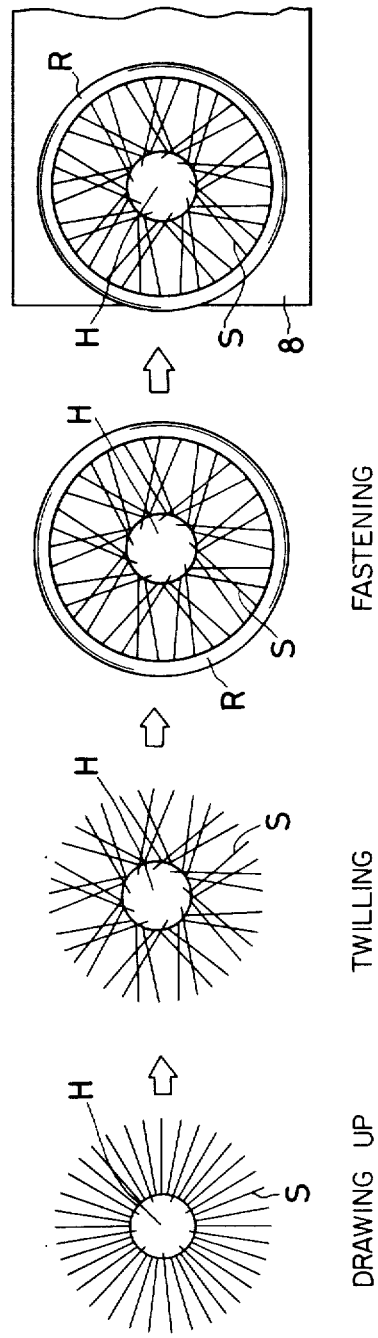
FIG. 1B is a view showing various steps of assembling a wheel in coincidence with FIG. 1A.

With reference to FIG. 1B, assembling a spoked wheel by the method of this invention includes the steps of drawing up, twilling, and fastening.

Drawing up is an operation wherein a hub H with spokes S attached at different levels is rotated in a horizontal plane so that all spokes S are radially extended by centrifugal action. Then while rotating, a retainer individually cradles the otherwise free ends of each spoke S so as to maintain the extended, horizontal relative position between hub H and spokes S.

Twilling is the subsequent operation wherein the extended ends of the spokes S are rotated in a generally horizontal plane relative to the hub H. Each level of spokes S is rotated in a prescribed direction through a prescribed angle relative to the hub H to provide a crossing of spokes S which gives strength and rigidity to the wheel after the rim R is added.

Fastening is the next subsequent operation wherein the positioned spokes S are flexed elastically to allow positioning of the wheel rim R concentrically with the hub H. When the flexing force is removed, the spokes again extend to full length and tips of the spokes S enter spoke receiving holes in the wheel rim R where nipple fasteners are applied to rigidize the assembled wheel.

FIG. 1A illustrates an apparatus for performing the above operations as more fully described hereinafter. The drawing-up mechanism is indicated by the number 1; and numbers 2 and 3 indicate the twilling and fastening mechanisms respectively. The carrier mechanism which transports the hub H with spokes S consecutively from the drawing up mechanism 1 to the twilling 2; and fastening 3 mechanism, in turn, is indicated by the number 4.

DRAWING UP MECHANISM 1

(see FIGS. 1 through 7)

In the drawing up mechanism 1, the hub H with spokes S rotatably fitted at the base ends thereof is retained in a horizontal posture (FIGS. 1, 2) and the hub H is rotated at a speed sufficient to extend each spoke S radially with respect to the center of the hub H and to retain this extended radial posture. A main shaft 21 is rotatably and vertically secured to a top plate 11 of a frame 10 serving as a base.

The main shaft 21 is rotatably mounted in an upright posture on the top plate 11 by means of a bearing 29 and is in the form of a hollow cylinder. A drive pulley 17 is fixedly mounted at the lower end of the shaft 21 below the top plate 11 and positioned within the frame 10. This pulley 17 has a power chuck 20 mounted thereon through a spacer 19.

A belt 16 is trained around the drive pulley 17 and a motor pulley 15 of a motor 14 is secured to the frame 10 through a mounting plate 13 so that the main shaft 21 may be rotated by the motor 14. The drive pulley 17 has a peripheral edge partially formed with equally spaced stop holes 18 in an amount according to the number of spokes S (in case there are 36 spokes S, 9 holes are required) so that when a stop pin 47 enters the stop hole 18, the stop position of the main shaft 21 is accurately controlled.

The stop pin 47 is mounted on a piston rod 49 associated with a stop cylinder 46 mounted on the frame 10 so as to permit forward and backward movements of the pin 47 integrally with the piston 48. A lock member 50 is mounted at the rear end of the piston rod 49 so that the lock member 50 engages a double actuator limit switch 51 determining limits of forward and backward movements of the stop pin 47. A mounting bed 23 is secured to the upper end of the main shaft 21 on which is fixedly mounted a hollow cylinder 24 with the hub H resting on the upper surface thereof. The fixed cylinder 24 is concentric with the main shaft 21.

Near the upper end of the fixed cylinder 24, there is a partitioning plate 25, and a centering pin 27 protrudes through the upper surface of plate 26 extending concentrically with the axis of the main shaft 21 to fit firmly into a central hub hole in the hub H rested on the fixed cylinder 24 thereby accurately centering the hub H with respect to the main shaft 21. Preferably, in order to accurately control the positioning of the hub H on the drawing up mechanism 1, a locating pin 28 (see FIG. 7) is fitted into a spoke receiving hole in the hub H as the hub H is rested on the fixed cylinder 24.

At the top of the fixed cylinder 24, an obliquely, downwardly-spread parasol-shaped body 25 is mounted which functions to prevent spokes S from being readily entangled with one another which would otherwise occur by dangling of the spokes S when the hub H is first mounted on the drawing-up mechanism 1.

Within the hollow main shaft 21 is a lifting shaft 30, the lower end of which is connected to the power chuck 20 enabling the shaft 30 to move up and down within the main shaft 21.

Figure 2:
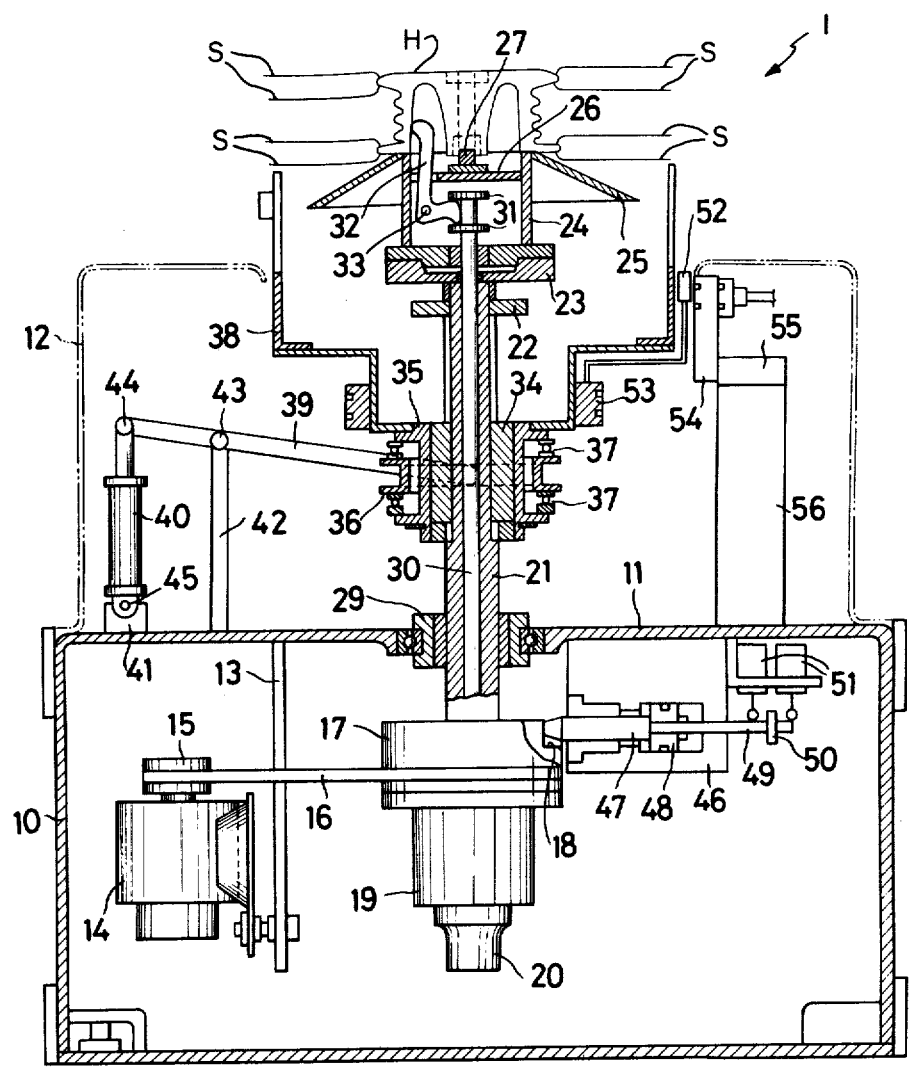
Figure 3:
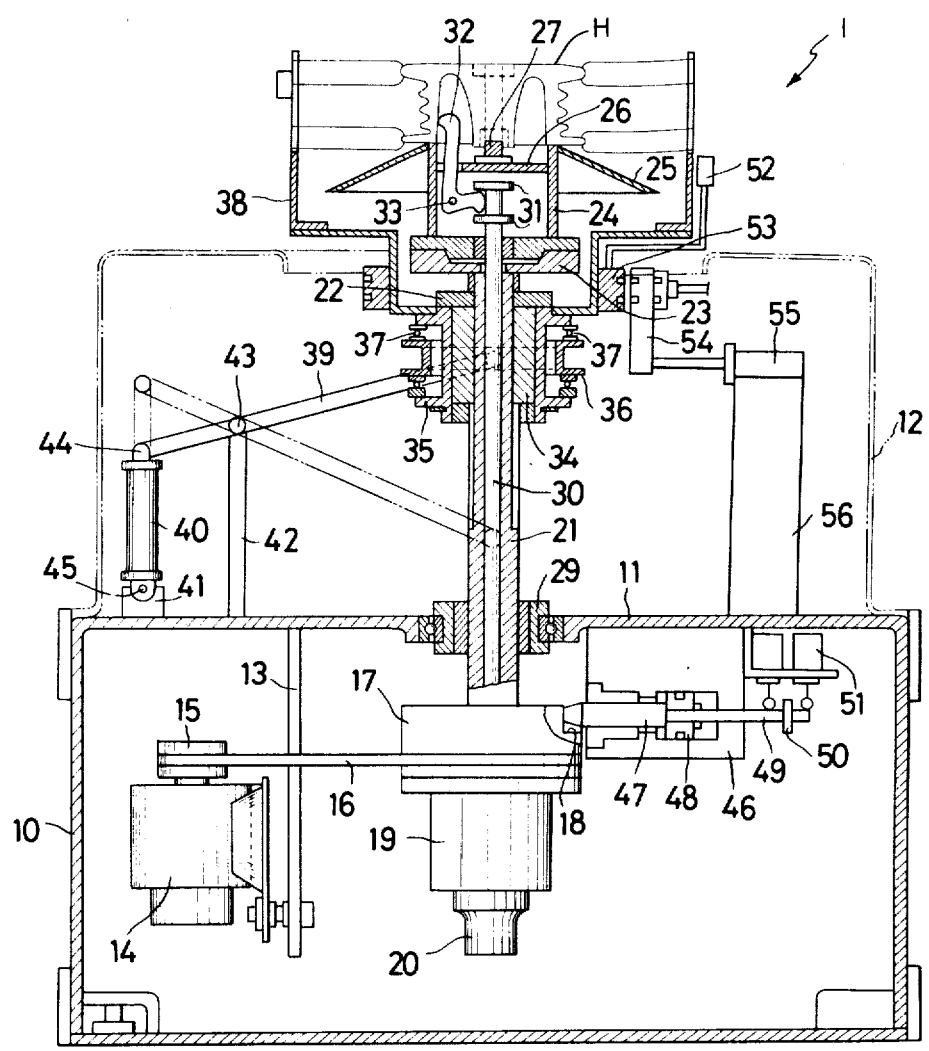

Two lock plates 31 are mounted in spaced relation on the upper end of the lift shaft 30 within the fixed cylinder 24. Retainer bodies 32, which immovably retain the hub H in place on the fixed cylinder 24 have a base end engaged between the two lock plates 31. For the sake of clarity, only one retainer body 32 is shown in FIGS. 2 and 3.

This retainer body 32 is L-shaped and the body 32 is secured at the bend to the fixed cylinder 24 by means of a pivot pin 33. The upper end of the retainer body 32 protrudes above the partition plate 26 to a level higher than the upper edge of the fixed cylinder 24 so as to contact the inner peripheral surface of the hub H when the hub H is rested on the fixed cylinder 24.

Several, e.g., three or four, retainer bodies 32 of the type as described are mounted about the lifting shaft 30 in equally spaced relation so that as the lifting shaft 30 moves up, the base ends of the retainer bodies 32 are pushed up by the lower lock plate 31 to cause the upper extremities of the L-shaped bodies 32 to strongly push against the inner peripheral surface of the hub H resting on the fixed cylinder 24 thereby fixedly but removably retaining the hub H. When the lifting shaft 30 moves down, the lower ends of the retainer bodies 32 are pushed down by the upper lock plate 31 to pivot the retainer bodies 32 and thereby release the retaining force applied to the hub H.

The outer peripheral surface of the main shaft 21 extended upwardly of the top plate 11 is a splined shaft or a construction formed with a keyway, and a lifting body 34 is supported on the main shaft 21 not for rotation relative to the shaft 21 but for vertical reciprocal motion along the shaft 21.

The lifting body 34 has a retaining drum 38 secured thereto through a spacer 35 and has a channel ring 36 rotatably fitted thereon through a bearing 37 so that the lifting body 34 can rotate with the shaft 21 while the channel ring 36 remains stationary.

The retaining drum 38 is cylindrical and concentric with the main shaft 21 and hub H. Spokes S extending radially from the hub H because of centrifugal force when the hub H is rotated, extend beyond the circumferential edge of the drum 38. Also, this retaining drum 38 has an upper edge formed with retaining grooves M (see FIGS. 4 and 5), which are in alignment with the radially positioned spokes S and have their depth below the edge of the drum 38 corresponding to the height position of the spokes aligned thereto.

It should be noted at this time that the spokes S extend from the hub flanges at four distinct levels with two levels of spokes S extending from the upper horizontal flange (as seen in FIG. 2) and two levels of spokes S extending from the lower horizontal flange of the hub H. The retaining grooves M in the drum 38 are cut in from the upper edge of the drum 38 to four levels spaced apart vertically to correspond to the levels of spokes. The grooves M are equally spaced circumferentially around the drum 38 and the pattern of groove level repeats after every four spokes.

That is (when the drum 38 is vertically aligned to the hub H, as explained hereinafter) among the retaining grooves M, a retaining groove MA, which is aligned in elevation to the uppermost spoke SA fitted in the top flange of the hub H (FIG. 3) by extending therethrough from the lower surface to the upper surface, is smallest in depth. The other retaining grooves MB, MC, and MD are increased in their depth; and retaining groove MB is aligned to a spoke SB fitted in the top flange of the hub H and extended therethrough from the upper surface to the lower surface; and retaining groove MC is aligned to a spoke SC (Please see FIG. 7) fitted in the bottom flange of the hub H extending therethrough from the lower surface to the upper surface; and retaining groove MD is aligned to a spoke SD fitted in the bottom flange of the hub H and extending therethrough from the upper to the lower flange surface.

Not only the vertical relationships but also the angular relationship of the retaining grooves M in the drum 38 is entirely in coincidence with those of spokes S emanating from the hub H. As shown in FIG. 5, the retaining grooves are arranged in a specified sequential and repetitive order, i.e., MA, MB, MC and MD, around the circumference of the retaining drum 38 with each of the retaining grooves M being positioned on an imaginary vertical radial plane (not shown) which connects the rotational axis of the hub H with the spoke receiving holes in the flanges of the hub H. In a wheel with 36 spokes, for example, adjacent retaining grooves M are positioned about the hub H at 10° intervals and the depth pattern of grooves repeats in groupings of four.

As channel ring 36 rotatably fitted about the main shaft 21, as described above, is formed with an outwardly open groove, within which a roller is loosely fitted (as indicated by broken lines in FIGS. 2 and 3). The roller is mounted at the end of a lifting arm 39 whose middle portion is rotatably mounted at a fulcrum pin 43 on the upper end of a supporting rod 42 secured to the top plate 11 so that oscillation of the lifting arm 39 about the fulcrum pin 43 causes the lifting body 34 with the attached retaining drum 38 to move vertically while both body 34 and retaining drum 38 rotate in unison with the main shaft 21.

The other end of the lifting arm 39, which causes the retaining drum 38 to move vertically along the main shaft 21, is coupled at a pin 44 to the extended end of a piston rod from a lifting cylinder 40. The bottom of cylinder 40 is pivotally secured by a pivot pin 45 to the top plate 11 through a bracket 41 so that when the lifting cylinder 40 is actuated to extend the piston rod, the far end of the lifting arm 39 moves down to permit the retaining drum 38 to assume its lowest position (as shown in FIG. 2), whereas when the lifting cylinder 40 is actuated to retract the piston rod, the far end of the lifting arm 39 moves up to cause the retaining drum 38 to assume its uppermost position (as shown in FIG. 3) thereby causing each of spokes S to be positioned within a retaining groove M corresponding thereto.

A sensitive electrical switch 52 is provided (FIG. 2, 3, 6) at the bottom of each of retaining the grooves M to close when the spoke S is positioned within the retaining groove M. These sensitive switches 52 are connected in series with each other and are connected to a collector ring 53 mounted on the outer peripheral surface at the lower end of the retaining drum 38. Adjacent to the collector ring 53, when the retaining drum 38 is at its uppermost position, there is mounted a collector 54 at the end of a piston rod from a cylinder 55 mounted on the top plate 11 by a mounting bed 56. The connection cylinder 55 is extended prior to completion of the drawing-up operation to provide a sliding contact between the collector ring 53 and the collector 54 thereby testing whether or not the spokes S are positioned within all of the retaining grooves M as indicated by closure of all the series switches 52.

In addition, a stop 22 attached to the shaft 21 is provided to accurately determine an upper limit position of the retaining drum 38, and a cover 12 is provided to conceal various elements on the top plate 11 except for the elements for retaining the hub H mounted on the upper end of the main shaft 21, and the retaining drum 38, which extend above the cover 12. It is to be noted that the aforementioned stop 22 and cover 12 are options which may be provided as desired.

The vertical stop 22 or the motion of arm 39 is such that when the shaft 21 is rotated so that the spokes S extend radially and horizontally from the hub H because of centrifugal force, the retaining drum will rise to the vertical level at which each spoke S will be cradled in an appropriate retaining groove M.

It should particularly be noted in the drawing up mechanism 1 that the hub H is retained in a position on the cylinder 24 in such a manner that positions of the spokes S may accurately be determined. The action of the locating pin 28 plays an important role; however, the locating pin 28 by itself does not suffice to assure the proper angular orientation of the hub. Thus, locating of the hub in the desired angular orientation may be achieved by relying on rib members formed in the inner peripheral surface of the hub H or by relying on a keyway formed in the central opening of the hub H and indexing with the centering pin 27, all in a well-known manner.

TWILLING MECHANISM 2

(See FIGS. 8 through 23 and FIG. 1A)

In the twiling mechanism 2, spokes S still held in horizontally radial positions are divided by level into four groups SA, SB, SC, and SD. Then, each group of spokes is rotated and displaced by a desired angle in a desired direction relative to a stationary hub H to twill the spokes while maintaining them in a horizontal posture. After this, the spokes S are vertically tilted and converged so that the tip of each spoke lies on a single circle.

This twilling mechanism 2 includes a hollow cylindrical bases 61 vertically and fixedly mounted on a top plate 60 of a mounting bed 59 arranged on the top plate 11 of the bed frame. A hub H, with spokes S radially extended and horizontal, is rested and retained on a cylinder 62 secured to the upper end of the cylindrical base 61.

The means and structure for resting and retaining the hub H on the cylinder 62 is identical with that for retaining the hub H in the drawing up mechanism 1 as previously described. Namely, the cylinder 62 is covered with a top plate 63 which has a centering pin 64 protruding upwardly at its center to engage the central hole in the hub H.

Figure 8:
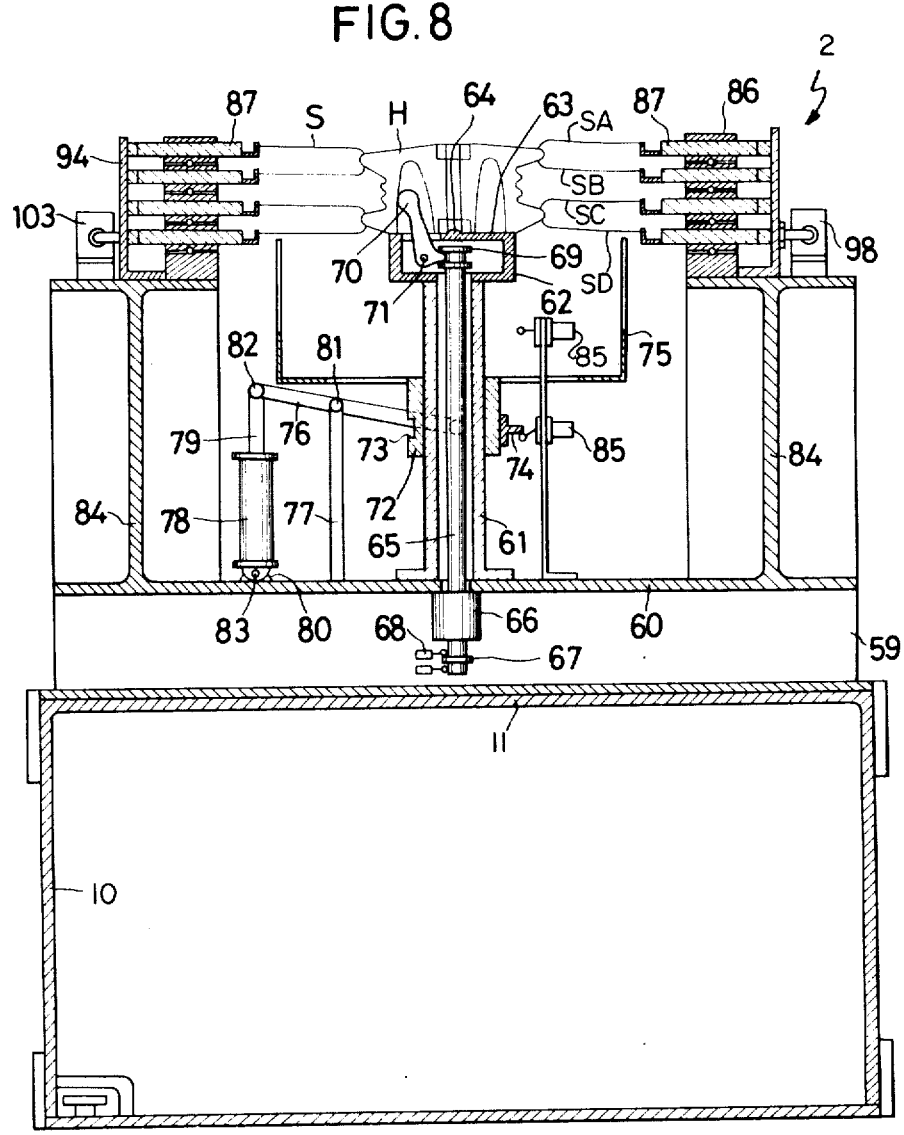
Figure 9:
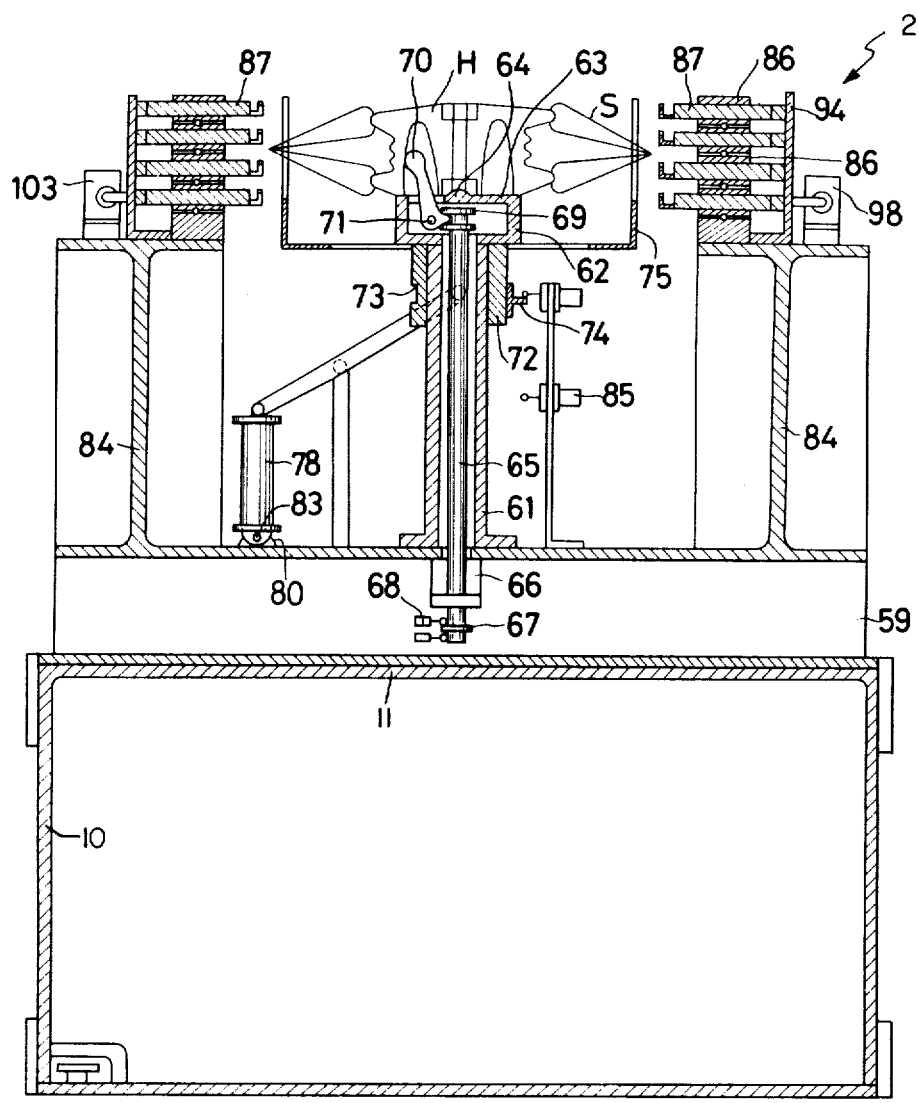
Figure 14:
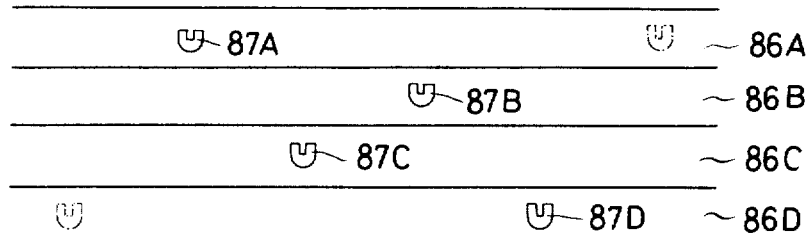
Figure 15:
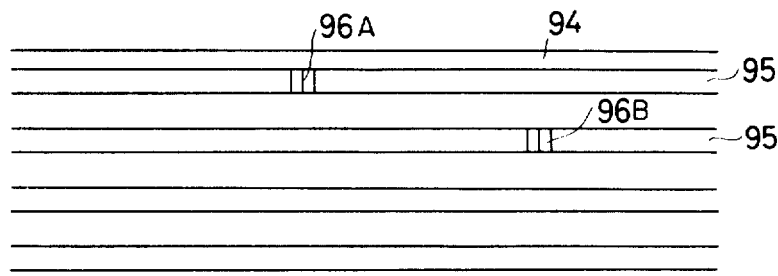

A lifting shaft 65 fits slidably within the cylindrical base 61 and connects at its lower end to a lifting cylinder 66 which is connected to the top plate 60. At its upper end, the internal shaft 65 engages the lower ends of L-shaped retaining bodies 70 which are exactly the same construction as that of the aforementioned retaining bodies 32. For the sake of clarity in illustration only, one retaining body 70 as shown in FIGS. 8 and 9. The retaining body 70 is rotatably secured by means of a pivot in 71 to the cylinder 62 and is engagably positioned at the lower end between two lock plates 69 mounted in a spaced relation on the upper end of the lifting shaft 65. The upper end of the retaining body 70 extends through the top plate 63 and is directed forcefully against the inner peripheral surface of the hub H rested on the cylinder 62, so as to hold the hub concentric with the cylinder 61 as described above. That is, when the lifting shaft 65 is moved up the lifting cylinder 66, the lower ends of the retainer bodies 70 are pushed up by the lower lock plate 69 to cause the upper extremities of the retainer bodies 70 to be disengaged from the inner peripheral surface of the hub H thereby releasing the hub H.

It is to be noted that two limit switches 68 at the lower end of the lifting shaft 65 are for the purpose of determining upper and lower limits of the lifting shaft 65.

The cylindrical base 61 has a circular lifting bed 72 fixedly mounted thereon, not rotatably, but able to move up and down with respect to the cylindrical base bed 61 so as to form a base for mounting a retaining drum 75. The drum 75 retains the spokes S after the spokes S are twilled and the tips thereof are inclined against a single circle as explained more fully hereinafter.

The vertical movement of the lifting bed 72 is accomplished in a manner identical with that of the lifting body 34 in the drawing up mechanism 1 as previously described. That is, a roller (as indicated by the broken lines in FIGS. 8 and 9), which is rotatably disposed at the extremity of a lifting arm 76, is loosely fitted in a peripheral groove 73 formed in the surface of the lifting bed 72. The lifting arm 76 is rotatably secured substantially at the midpoint by a pivot pin 81 to the upper end of a supporting rod 77 vertically mounted on the top plate 60, and one end of the lifting arm 76 is coupled at a pin 82 to the end of a piston rod 79 of a lifting cylinder 78 having a base end pivotally secured by a pivot pin 83 to the top plate 60 via a bracket 80.

When the lifting cylinder 78 is actuated to move the piston rod 79 downwardly, the roller mounted on the far end of the lifting arm 76 moves up, whereby the lifting bed 72 and the retaining drum 75 move up. When the lifting cylinder 78 is actuated to move the piston rod 79 upwardly, the far end of the lifting arm 76 moves down, whereby the retaining drum 75 moves down.

A lug 74 mounted on the lifting bed 72 is provided to actuate two limit switches 85 stationarily positioned within the range of vertical operation of the lifting bed 72, the upper limit switch 85 determining an upper limit of the lifting bed and the attached retaining drum 75 while the lower limit switch 85 determines a lower limit of travel of the retaining drum 75.

On the top plate 60 is fixedly mounted a cylindrical-shaped bed 84 having a top flange at a level close to the top of the cylindrical base 61 and the cylindrical base 61, the retaining drum 75, the lift cylinder 78, and the like are within the cylinder 84. Retainer pins 87 on the outer cylindrical bed 84 are arranged for individually retaining spokes S in a desired positional relationship.

Four rotary rings 86 are stacked rotatably slidable one on the other positioned atop the cylindrical bed 84 concentrically with the cylindrical base 61. Retainer pins 87 are distributed uniformly around the rotary rings 86 and extend radially inward from the rings 86 toward the hub H (See FIGS. 8–12). The number of retainer pins 87 associated with each rotary ring 86 is exactly equal to the number of spokes S emanating at each level from the hub H. Thus, for example, a thirty-six spoke whell will have nine spokes S at each of four levels, and each rotary ring 86 will have nine equi-spaced retainer pins 87 located 40° apart around its circumference.

The uppermost rotary ring 86 is at an elevation above the cylindrical bed 84 to retain the top level of spokes SA in the retainer pins 87. The thickness of the stacked rotary rings 86 is such that the next lower adjacent ring 86 is at the level to retain the next lower level of the spokes SB, and so forth down for spoke levels SC and SD.

For the lower two levels of spokes SC, SD, the retainer pins 87 are fixedly attached to the rotary rings 86; but for the two upper levels of spokes SA, SB, the retainer pins 87 are attached to the rotary rings 86 so as to permit radially reciprocal motion of the pins 87. As shown in FIGS. 11, 12, a key 91 extends laterally from the cylindrical retainer pin 87 and engages loosely in keyway 92 formed into the wall of the hole through the rotary ring 86. The key 91 and keyway 92 prevents rotation of the retainer pins 87 in the rotary ring 86. For the upper reciprocating rings 86A and 86B (See FIG. 10), a lock plate 89 retains a compression spring 93 against the rotary ring 86 whereby the retainer pin tends to be withdrawn from the rotary ring 86.

Further, it should be noted also that the outer end of each spoke S is actually retained by a square-grooved retainer member 88 secured to the inner end of the retainer pin 87.

A cylindrical outer durm 94 is rotatably supported on the outer cylindrical bed 84 with the axis of the drum 94 concentric with the center axis of the cylindrical base 61. This outer drum 94 forms a base for mounting a cam ring 95 for controlling the reciprocal movement of the retainer pins 87 for retaining spokes SA and SB. The cam ring 95 is secured to react against the outer end of the retainer pins 87 for retaining spokes SA and SB.

The positional relationship between the retainer pins 87 and the cam faces 96 and the positional relationship of the retainer pins 87 prior to and after the twilling will be discussed hereinafter in conjunction with an embodiment, used as an example, where the number of spokes S is thirty-six. Refer to FIGS. 14 through 17.

Prior to twilling, retainer pins 87 supporting spokes SA, SB, SC, and SD, respectively, are peripherally spaced around the stacked rotary rings 86. Each pin 87 is rotationally displaced from the next pin 87 by an angle of 10°. The angular ordering of pins is 87A, 87C, 87B, and 87D; each pin 87 is located 10° circumferentially from the next adjacent, though as explained above, the pins are displaced vertically as well so a retaining pin 87A receives an upper spoke SA, and so forth. The pattern repeats after each sequence, called a block, of four pins 87 and each level, i.e., A, B, C, and D, provides nine retaining pins 87, each located 40° from the other on a single rotary ring 86.

On the other hand, the cam face 96A at the level with the retainer pin 87A is positioned directly above the retainer pin 87C in the same block (FIGS. 14, 15); that is, positioned forward by a center angle of 10° apart from the retainer pin 87A. The cam face 96B at the level with the retainer pin 87B is likewise positioned forward by the center angle of 10° away from the retainer pin 87B.

The rotary rings 86A and 86C are rotated through a center angle of 40° in a desired direction from the position (FIG. 16) as previously described and at the same time, and the rotary rings 86B and 86D are rotated through a center angle of 40° in a direction opposite of the rings 86A and 86C for the purpose of twilling.

After this rotation (FIG. 17), the retainer pins 87A, B, C, and D originally constituting a single block have been displaced apart to become parts of two distinctly separate blocks of pins 87 with another block intervening. However, the arrangement of retainer pins in the block, thus newly formed, is exactly the same as that prior to the twilling operation.

Since the retainer pins 87A and 87B have rotated only by the angle of 40°, each merely assumes a position where another retainer pin 87A and 87B, respectively, was previously located; and therefore, the positions of retainer pins 87A and 87B relative to the cam faces 96A and 96B are not varied at all.

For this reason, when the outer drum 94 is rotated by the central angle of 10° in a direction toward the closest retainer pin 87, the cam end 90 of retainer pins 87A and 87B indexes into the cam faces 96 by the action of the springs 93 to withdraw the retainer pins 87A and 87B, whereby spokes SA and SB being retained to this time by the retainer pins 87A and 87B are disengaged from the retainer pins 87A and 87B and fall into and are retained in retaining grooves NA and NB in the retaining drum 75 positioned below.

Thus, the operation of twilling is accomplished by rotation of the rotary rings 86 and outer drum 94. The mechanism for rotating the rotary rings 86 and outer drum 94 follows with reference to FIGS. 18–20.

Rotary rings 86A and 86C are integrally connected, and a connecting rod 97 attached to rings 86A and 86C and extended through a peripheral slot 94' made in the outer drum 94 protrudes outwardly of the outer drum 94. The end of a piston rod 99 of a cylinder 98, with a base end thereof rotatably mounted on the outer cylindrical bed 84 through a fixing member 100, is connected by means of a connection pin 101 to the end of the connecting rod 97.

On the other hand, rotary rings 86B and 86D are also integrally connected; and a connecting rod 102 extended through a peripheral slot (not shown) made in the outer drum 94 protrudes outwardly of the outer drum 94. The end of a piston rod 104 of a cylinder 103, with a base end thereof rotatably mounted on the outer cylindrical bed 84 through a fixing member 105, is connected by means of a connection pin 106 to the end of the connecting rod 102.

It will be appreciated that rotation of the outer drum 94 may be accomplished by a mechanism in which the end of a piston rod 109 of a rotary cylinder 108, with a base end thereof rotatably mounted on the outer cylindrical bed 84 by a fixing member 100, is connected by means of a connection pin 113 to the end of a connecting rod 107 suitably protruded from the outer peripheral surface of the outer drum 94.

It should be noted that both the peripheral slots 94' made in the outer drum 94 in order to protrude the connecting rods 97 and 102 are not always the same in their peripheral length; but at least one peripheral slot, on the side where the connecting rod is connected to the rotary ring 86 which rotates in a direction opposite to that of the outer drum 94 is positioned, must have an arc of 50°. Otherwise, a 40° slot suffices.

As previously described, the retaining drum 75, which retains spokes S in a final twilling posture where the far ends thereof are positioned on a single circle, is mounted on the lifting bed 72 with the axis thereof registered with the vertical axis of the cylindrical base 61, the upper edge of the drum at its lowest position being located approximately one spoke diameter below the ends of the spokes S.

The upper edge portion of the retaining drum 75 is formed (FIGS. 22, 23) with retaining grooves N having the depth corresponding to the height of the aligned spoke S in the spoke's final twilled posture. Thus, spokes SC and SD are moved up after they have been twilled in a horizontal condition by rotation of the rotary rings 86 and are retained in retaining grooves NC and ND aligned to those spokes. Spokes SA and SB disengaged from retainer pins 87A and 87B by rotation of the outer drum 94 and falling are fitted and retained in retaining grooves NA and NB. The upper limit position of the retaining drum 75 FIG. 9) when the spokes SA and SB are retained is present so that the ends of all spokes S retained in the retaining grooves N lie on a single common circle.

Arrangement of retaining grooves N in the retaining drum 75 is similar to that of retaining grooves M in the retaining drum 38 contained in the aforementioned drawing-up mechanism 1 with the exception that the spacing and depth of the retaining grooves N are different from those of retaining grooves M because the spokes S are no longer oriented radially and horizontally. See FIG. 21.

Briefly stated, the hub is located in the twilling mechanism 2 in a preset alignment to retaining drum 75 with all spokes S radially and horizontally supported by retainer pins 87. See FIGS. 8 and 18. The spokes S are twilled by centrarotation of paired rotary rings 86A and 86C in relation to rotary rings 86B and 86D. See FIGS. 19, 21. Next, retaining drum 75 is raised vertically, engaging the lower spokes SC and SD in grooves NC and ND and disengaging said spokes SC and SD from the lower retainer pins 87C and D. See FIGS. 9, 22, and 23. Finally, the outer drum 94 is rotated causing, by cam action, the upper spokes SA and SC to disengage from the upper reciprocating retainer pins 87A and B and fall into grooves NA and NB of the retaining drum 75. See FIGS. 9 and 20.

FASTENING MECHANISM 3

Figure 24:
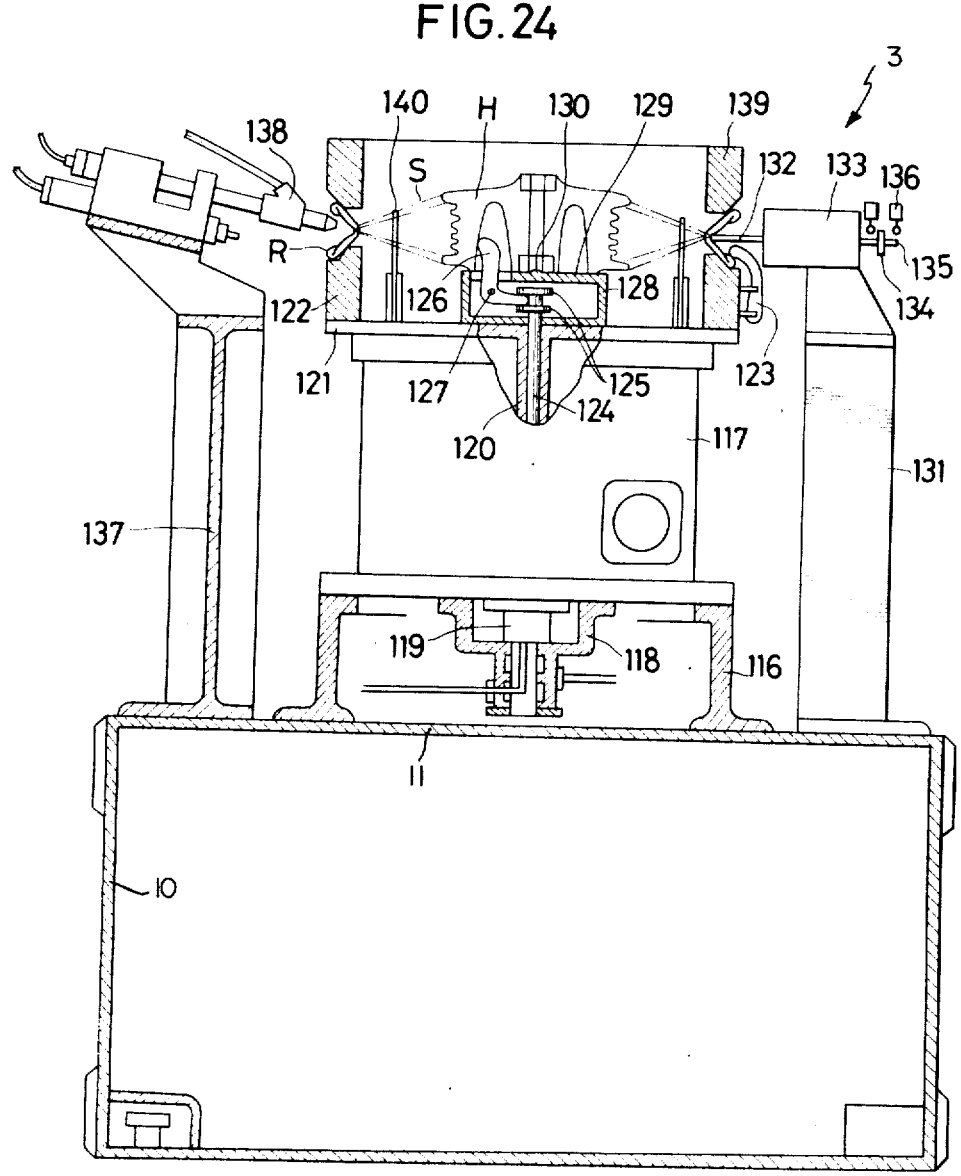
Figures 25, 26, 28, 29:
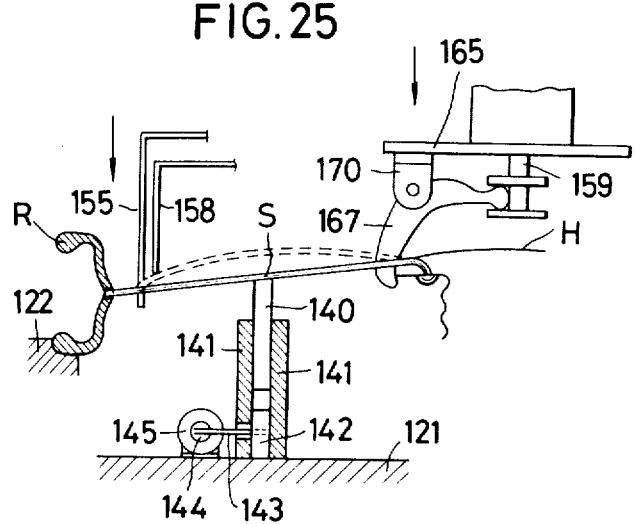

(See FIGS. 24 through 26)

In the fastening mechanism 3, spokes S, twilled in their desired posture in the preceding twilling mechanism 2, are smoothly entered into spoke receiving holes in the rim R thereby facilitating tight connection of the rim R with the spokes S by nipple-fastening.

An index table 117 is fixedly mounted by a mounting bed 116 on a top plate 11 of the base frame 10. A mounting cylinder 128, on which the hub H is rested, is fixedly mounted concentrically on the upper surface of a turn table 121 which is secured to the upper end of a main shaft 120.

Similar to the fixed cylinder 24 in the aforementioned drawing up mechanism 1 and the cylinder 62 in the aforementioned twilling mechanism 2, the mounting cylinder 128 has a hub H retaining mechanism incorporated therein.

Namely, the lower end of a cylinder 119, held by a mounting body 118, is connected to a lifting shaft 124 within main shaft 120. This lifting shaft 124 passes through a central opening in the turn table 117. Two lock plates 125 in spaced relation are mounted at the upper end of a lifting shaft 124 positioned within the mounting cylinder 128, the lifting shaft 124 being arranged within a hollow main shaft 120, and a lower end of a retaining body 126 rotatably mounted by a pivot pin 127 on the mounting bed cylinder 128 is positioned between the two lock plates 125. The upper end of the retaining body 126 extends through a top plate 129 associated with the upper end of the mounting cylinder 128 and contacts the inner peripheral surface of the hub H rested on the mounting bed cylinder 128. The hub H is mounted concentrically with the main shaft 120 by fitting a centering pin 130, protruded from the upper surface of the top plate 129, into the central hub hole, whereby as the lifting shaft 124 is moved up and down by actuation of the cylinder 119, the end of the retaining body 126 is forcefully pushed against the inner peripheral surface of the hub H to retain the hub H in position on the mounting bed cylinder 128. Or the retaining body 126 is disengaged from the inner peripheral surface of the hub H to release the hub H from the mounting cylinder 128.

A retaining cylinder 122 is secured to the peripheral edge on the upper surface of the turn table 121, and concentric to the main shaft 120. A rim R rests atop the retaining cylinder 122, resting on the contoured surface. A centering ring 139 rests atop the rim R (FIG. 24). Prior to supplying a combination of spokes S and hub H from the twilling mechanism 2 onto the mounting cylinder 128, operation of the centering ring 139 causes the rim R to form a true circle and to simultaneously and accurately register the axis thereof with the axis of the main shaft 120.

The rim R may be retained positively in the retaining cylinder 122 by the provision of the desired number of clamp elements 123 arranged in equally spaced relation around the retaining bed cylinder 122. This clamp element 123 is given a desired clamping force by a cylinder not shown embedded within the retaining bed cylinder 122.

Further, when the hub H is retained on the mounting bed cylinder 128, plate-like push-up elements 140 aligned to the center of individual spokes S are mounted movably up and down on the upper surface of the turntable 121.

A mechanism for fixing and vertically moving these push-up elements 140 includes dual cylindrical shaped guide rings 141 with the push-up elements 140 positioned and held within a longitudinal groove between the guide rings 141 which are fixedly mounted on the turntable 121. Each push-up element 140 is rested on a cam ring 142 arranged at the bottom of the guide ring 141. See FIGS. 25 and 26.

The upper surface of the cam ring 142 where the push-up elements 140 are positioned is formed with a saw-tooth-like cam face, and the lower end surfaces of the push-up elements 140 are sloped to mate with the cam face.

The cam ring 142 has a connecting rod 143 integrally mounted therewith and the end of the connecting rod 143 is connected to the end of a piston rod 144 of a piston 145 fixedly mounted on the turntable 12. Operation of the piston 145 causes the cam ring 142 to rotate within the guide about the axis of the main shaft 120, whereby the push-up elements 140 rested on the cam faces of the cam ring 142 are moved up and down in accordance with the rotating direction of the cam ring 142.

A piston 133 is mounted on a mounting frame 131 which stands uprightly on the top plate 11 so as to assume a suitable position outwardly of the retaining bed cylinder 122. The piston 133 has a locating pin 132 whose left end is tapered and extended from the piston 133 to set the lateral position of the rim R retained on the retaining bed cylinder 122.

Spoke receiving holes made in the rim R are designed to correspond to spokes SA, SB, SC, and SD so that it is necessary to achieve accurate positioning of the rim R with respect to a combination of hub H and spokes S retained on the mounting bed cylinder 128.

The lateral position of the rim R is determined by the locating pin 132 indexing with an air receiving hole (not shown) formed in the rim R and used to inflate a tire which may later be mounted on the rim.

A lock element 134 is mounted at the rear end of the piston rod 135 protruded opposite to the locating pin 132, to determine the moving limits of the locating pin 132 by means of two limit switch 136 arranged to contact the lock element 134.

The locating operation using the locating pin 132 may be accomplished before the rim R is immovably retained on the retaining cylinder 122 by clamp elements 123. When the rim R is positioned on the retaining cylinder 122, the locating pin 132 is moved forward to engage the air hole and to determine the lateral and angular position of the rim R on th retaining cylinder 122. Then, the rim R is centered by positioning the centering ring 139 and retained by the clamp elements 123.

After the angular position and centering of the rim R have been determined in a manner as described above, as a consequence of which the rim R is fixedly (but removably) retained on the retaining cylinder 122, the locating pin 132 and the centering ring 139 are disengaged from the rim R.

A nipple driver 138 is fixedly mounted on a mounting support 137 and vertically mounted on the top plate 11 to allow an end thereof to externally align to a spoke receiving hole in the rim R retained on the retaining cylinder 122. The nipple driver 138 is provided to fasten a nipple to the end of a spoke S which has entered a spoke receiving hole in the rim R thereby tightly connecting the rim R to the spoke S. This nipple driver 138 simultaneously provides a supply and fastening of nipples.

It should be noted that the nipple-fastening applied to the end of a spoke S by means of the nipple driver 138 needs to be applied along the extended direction of the spoke S; but each group of spokes SA, SB, SC, and SD is different in their inclined angle as previously described. Hence, it is necessary to provide a plurality of nipple drivers 138 in the number corresponding to levels of spokes, e.g., SA, SB, SC, and SD. Thus, for the above example with four levels, it is necessary to provide four nipple drivers 138 (or multiples thereof) at individual angles paralleling the slant of the spokes S.

These four nipple drivers 138 may advantageously be arranged substantially in equally spaced relation around the outer periphery of the rim R to obtain an even-fastening force.

Using the fastening mechanism 3 as described when there are 36 spokes S and four nipple drivers 138, the turntable 121 is intermittently rotated along with the index table 117 through an angle of 40° so that upon completion of nine, intermittent, 40°, partial rotations of turntable, all of spokes S are fastened by nipples to the rim R.

CARRIER MECHANISM 4

(See FIGS. 27 through 29 and FIG. 1A)

The carrier mechanisms 4, 4' comprises a mechanism 4 whereby a combination of spokes S radially extended in a horizontal position from a hub H is carried from the drawing-up mechanism 1 to the twilling mechanism 2 while maintaining the spokes S in their radial position, and another mechanism 4' wherein a combination of spokes formed into a desired twilled pattern and the associated hub H is carried from the twilling mechanism 2 to the fastening mechanism 3 while maintaining the spokes S in their twilled pattern. Both mechanisms 4, 4' are identical in structure with each other with the exception that adjacent push plates 158 and hooks 155 are different in spacing as explained more fully hereinafter.

The carrier mechanisms 4, 4' are positioned above various mechanisms 1, 2, 3 previously described using a bed 147 slidably mounted on guide rails 146 which are mounted between pillars 7 (FIG. 1A). A main post 148 is fitted, not rotatably, but vertically reciprocatingly within the sliding bed 147 (FIG. 27). The main post 148 has at the lower end thereof a functioning portion for retaining a hub H and having push plates 158 and hooks 155 for individually retaining spokes S in a desired posture.

Vertical reciprocal movement of the main post 148 is accomplished in a manner such that a pinion 150, rotated and driven by a motor (not shown) mounted on the sliding bed 147, is placed in engagement with a rack 149 longitudinally formed in the outer peripheral surface of the main post 148. The main post 148 moves up and down as the aforesaid motor runs forward and in reverse.

A fitted cylinder 154, which serves as the mounting bed for the hooks 155, is rotatably incorporated at the lower end of the main post 148 through bearings 156, and the end of a piston rod of a rotary cylinder 152, mounted on a flange 151 immovably secured to the main post 148 directly above the fitted cylinder 154, is connected to the fitted cylinder 154 through a connecting rod 153 so that when the rotary cylinder 152 is actuated, the fitted cylinder 154 is rotated about the main post 148.

In the main post 148 directly below the fitted cylinder 154, a second fitted cylinder 157, which serves as the base for mounting push plates 158, is immovably mounted with respect to the main post 148.

The hooks 155 mounted on the fitted cylinder 154 and the push plates 158 mounted on the fitted cylinder 157 are all positioned in concentric rings about the axis of the main post with a hook 155 and push plate 158 being positioned adjacent to each other in a radial direction.

Preferably, both the hook 155 and push plate 158 are positioned proximate to the end of a spoke S, and those hooks and plated in the mechanism 4', whereby the combination of hub H and spokes S is carried from the twilling mechanism 2 to the fastening mechanism 3, are particularly preferred to locate at a position as close as possible to the end of a spoke S.

The spoke S may be retained by the hook 155 and push plate 158 (See FIGS. 28 and 29) in a mode where the spoke S is held between the lower end surface of the push plate 158 and a hook element 155' formed in a right angle bend at the lower end of the hook 155. However, in order to more positively retain the spoke S between the hook 155 and the push plate 158, it is preferable that the lower end surface of the push plate 158 which contacts the spoke S is preformed with a cutaway portion 158' into which spoke S is cradled and at the same time, a tip portion on the upper surface of the hook element 155' is formed into a tapered surface.

One push plate 158 and one hook 155 are required to retain one spoke, S thus both the push plate 158 and hook 155 are considerably limited in their width. Since the hook 155 is entered downwardly between a multitude of spokes S and thereafter must allow the hook element 155' to revolve and move under the lower end surface of the push plate 158, the hook 155 must have its width further smaller than the spacing between the spokes S.

The main post 148 has a circular base plate 165 secured to the lower end thereof; and retaining arms 167, which are of substantially the same construction as the retainer body 32 in the drawing up mechanism 1 and as the retainer body 70 in the twilling mechanism 2, as previously described. The arms 167 are pivotally mounted by means of fulcrum pins 170 on the desired number (e.g., three or four) of brackets 166 arranged in equally spaced relation around the peripheral edge of the lower surface of the base plate 165.

The retaining arms 167 are bent substantially in a right angle where they are fixed by the fulcrum pins 170, with one end 168 thereof loosely fitted between lock plates 161 secured in spaced relation to the lower end of a lifting shaft 159 which is reciprocally movable within the main post 148 and downwardly protruded from the base plate 165. The upper end of lifting shaft 159 is connected to a piston 160 of a cylinder 171 secured to the upper end of the main post 148. The end portion 169 of the retaining arms 167 are bended inwardly to form hooks.

When the cylinder 171 is actuated to move the lifting shaft 159, upward movement of the lifting shaft 159 causes the ends 169 of the retaining arms 167 to pivot inwardly thus retaining the upper flange of the hub H, while downward movement of the lifting shaft 159 causes the end 169 of the retaining arm 167 to pivot outwardly thus releasing the hub H.

A centering cylinder 162 is secured to the lower end of the lifting shaft 159, and the centering cylinder 162 has a centering pin 163 fitted movably up and down therein, which pin 163 is always subjected to a downward force by the action of a spring 164. When the centering pin 163 is fitted into the central hub hole in the hub H when the main post 148 is in its lower limit, it causes the axis of the main post 148 to register accurately with the axis of the hub H. The lower limit of the main post 148 may be set and detected as necessary in the manner using limit switches as described hereinbefore.

The centering devices in the carrier mechanisms 4, 4' are designed so that the lifting shaft 159 is operated to be moved up and down independently of the main post 148; and the centering operation by the centering pin 163 needs to be maintained in spite of the above-described upward and downward movement of the lifting shaft 159.

The hooks 155 and push plates 158 are provided in the same number as there are spokes to be positioned on a single circumference, as previously described.

The carrier mechanisms 4, 4' are identical except that the hooks 155 and push plates 158 of the first mechanism 4 are disposed to retain horizontal, radial spokes; and in the second mechanism 4', the hooks and push plates are disposed to retain twilled and angled spokes.

The various mechanisms 1, 2, 3 may be separately mounted or as previously described and as shown in FIG. 1A, it may be advantgeous to create a smooth flow of assembling operations with an arrangement such that the drawing up mechanism 1, twilling mechanism 2 and fastening mechanism 3 are arranged on a single base 10 in a linear fashion, with the guide rail 146 of the carrier mechanisms 4, 4' disposed between the pillars 7 uprightly secured to opposite ends of the base 10; and a delivery belt 8 for delivering assembled wheels outside the machine is arranged on the side to follow the fastening mechanism 3.

Next, the assembling procedures in conjunction with various steps will be described in order.

The steps in assembling a spoked wheel using the apparatus of this invention are described hereinafter.

DRAWING-UP STEP

After the hub H with spokes S rotatably fitted in holes therein has immovably been retained on the fixed cylinder 24 by the action of the retainer bodies 32, the motor 14 is driven to rotate the combination of the spokes S and the hub H along with the main shaft 21 at a speed to exert a sufficient centrifugal force to each of the spokes S so that the spokes S are radially extended from the center axis of the hub H.

During rotation, the lifting cylinder 40 extends its piston rod to the upper limit, thereby placing the lift body 34 and the retaining drum 38 at the lower limit where the spokes S are not hindered from being radially extended (FIG. 2).

When the spokes S are horizontally and radially drawn up, the lifting cylinder 40 is actuated to move the retaining drum 38 upwardly, which drum 38 is rotating integrally with the main shaft 21; that is, rotating in the same direction and at the same speed as the spokes S, whereby the spokes S in a horizontal and radial posture are fitted and positioned (see FIG. 3) in the respective retaining grooves M.

When the retaining drum 38 has reached the upper limit where the spokes S are fitted in the corresponding retaining grooves M, the electric power to the motor 14 is cut off to exert a braking force on the rotating operation of the main shaft 21 and to actuate the connection making cylinder 55 simultaneously therewith in order to ascertain that all the spokes S are fitted and positioned in the retaining grooves M without fail by the aid of sensitive switches 52.

Then, the stop cylinder 46 is actuated (at a time when the rotational speed of the main shaft 21 is sufficiently decreased) to advance the stop pin 47, thus allowing the stop pin 47 to enter a stop hole 18 formed in the drive pulley 17; thereby the main shaft 21 is stopped in a desired peripheral position.

PRIMARY CARRYING STEP

When the spokes S are stopped after they have been horizontally and radially drawn up and retained in the grooves M of the retaining drum 38, the main post 148 of the carrier mechanism 4 is moved down to engage the hub H with the retaining arms 167 and to rotate the rotary cylinder 152 simultaneously therewith so that each of the spokes S is retained between a hook 155 and a push plate 158 while maintaining a horizontal and radial posture.

After retaining the hub H and spokes in the carrier mechanism 4, the power chuck 20 (FIG. 3) is actuated in reverse to move the lifting shaft 30 downwardly, thus releasing the hub H from the grip of the retainer bodies 32. Then the main post 148 is moved upward disengaging the combination of hub H and spokes S from the drawing-up mechanism 1; and thence, mechanism 4 translates them along guide rails 146 into the twilling mechanism 2.

TWILLING STEP

Figure 16:
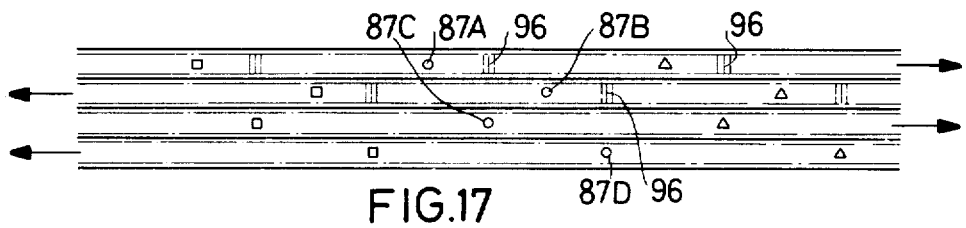

At the time when the hub H with the spokes S horizontally and radially drawn up is carried by the carrier mechanism 4 form the drawing-up mechanism 1 to the twilling mechanism 2, the retaining drum 75 is at the lower limit (FIG. 8) and the retainer pins 87 are in a condition as shown in FIG. 16.

Simultaneously, when the hub H is rested on the bed cylinder 62, the ends of the spokes S are fitted in the ends of the retainer pins 87 to allow the spokes to be released from engagement between the hook 155 and the push plate 158 in the carrier mechanism 4; thereby, the spokes remain held in their horizontal and radial posture.

Simultaneously, when the hub H is rested on the cylinder 62, the lifting shaft 65 is moved downwardly by the lifting cylinder 66, and the hub H is then retained on the cylinder 62 by the retaining bodies 70.

Figure 17:
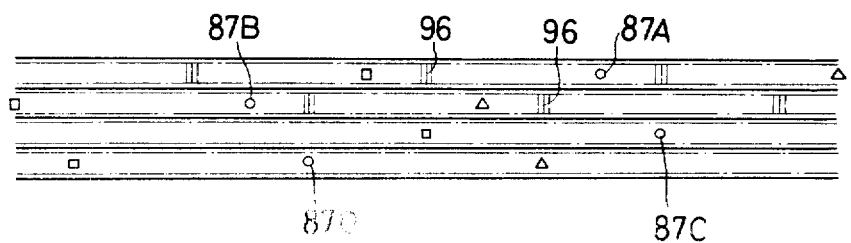
Figure 18:
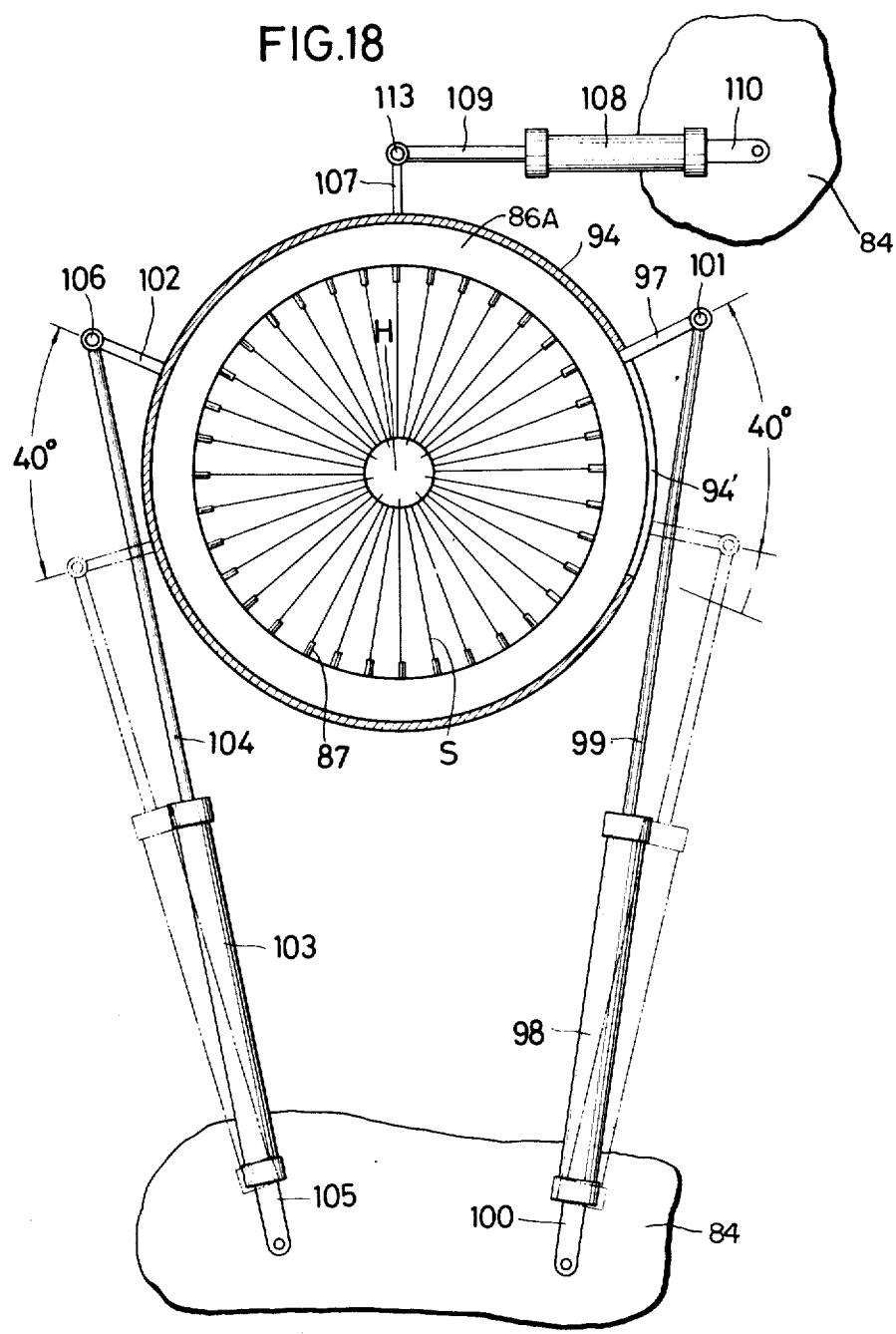
Figure 19:
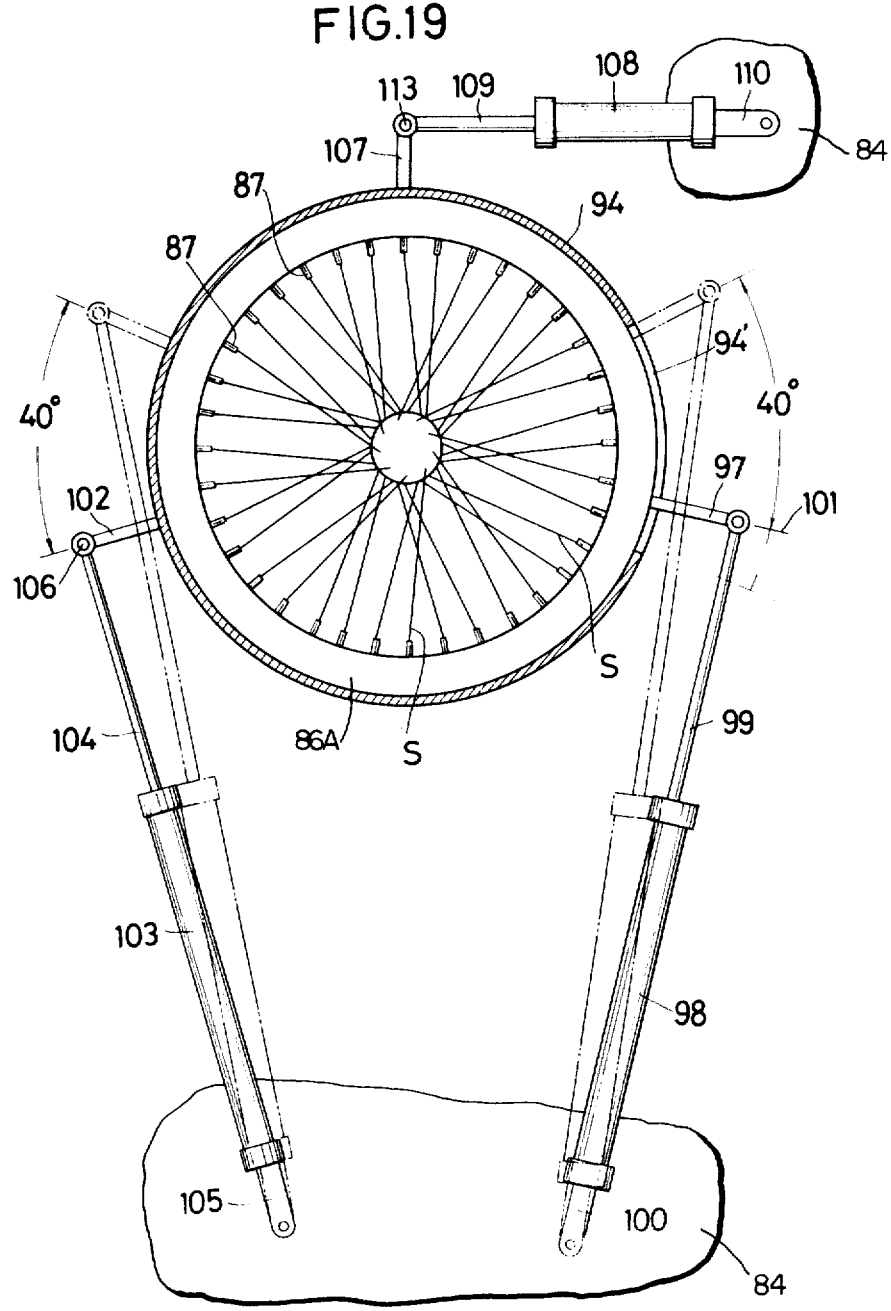
Figure 20:
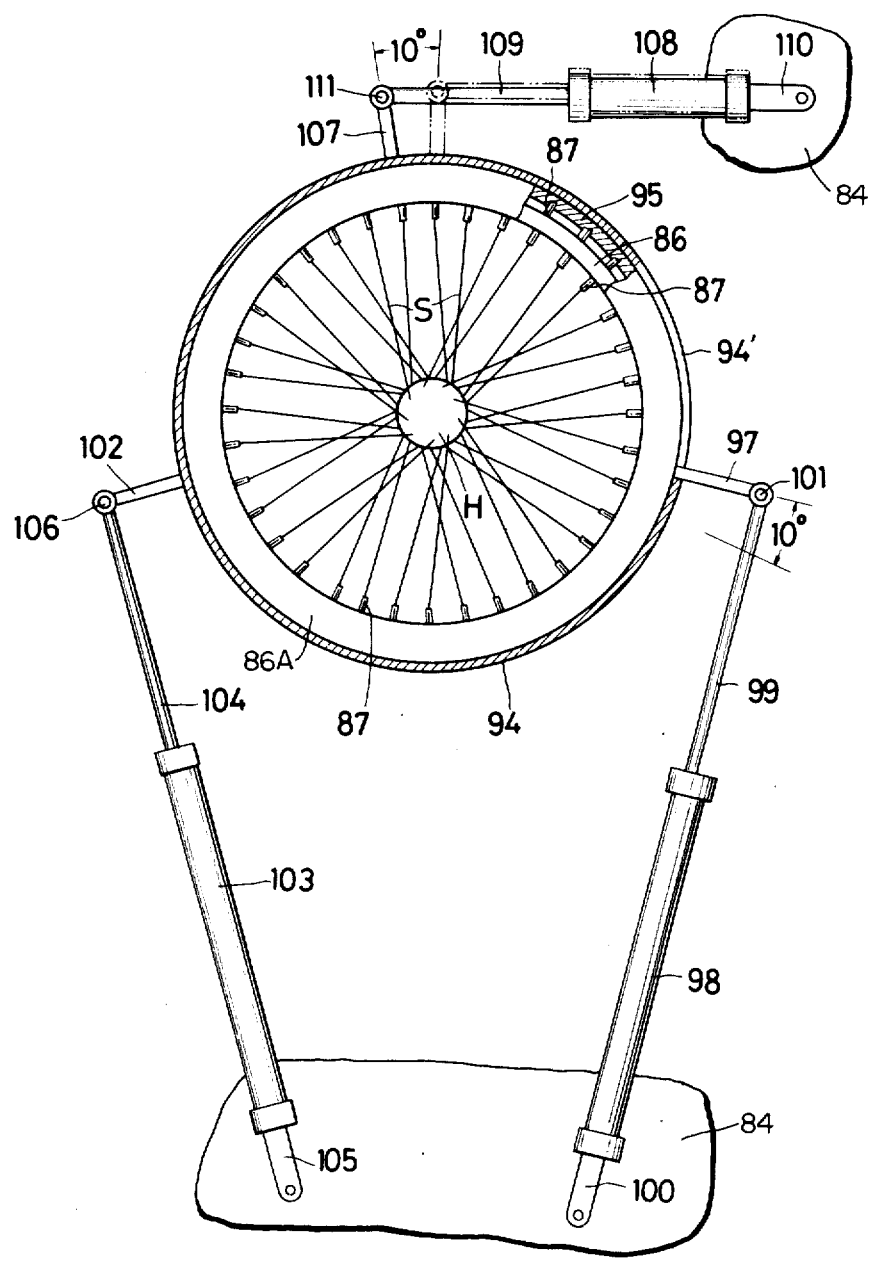
Figure 21:
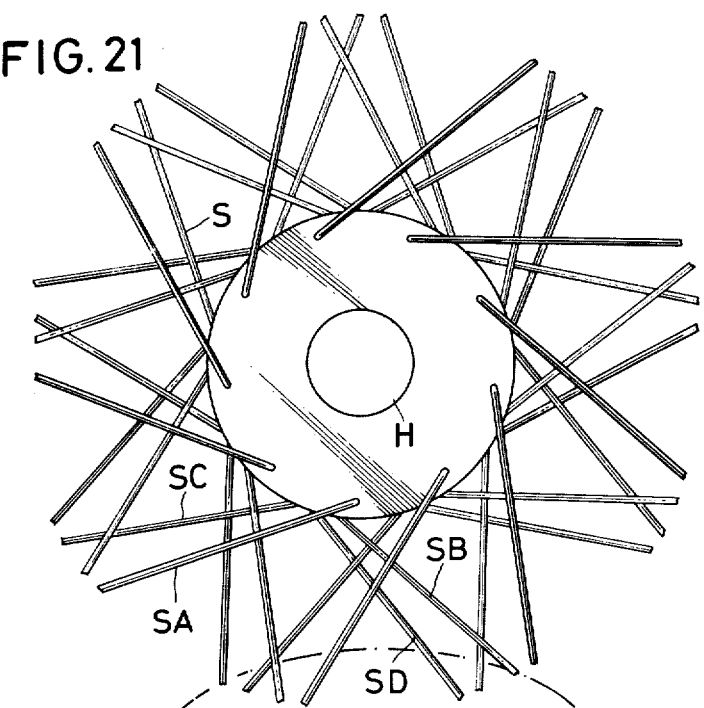
Figure 22:
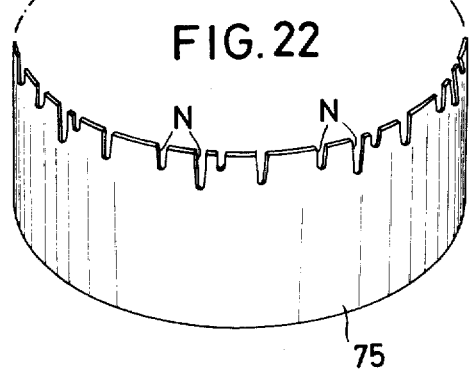
Figure 23:
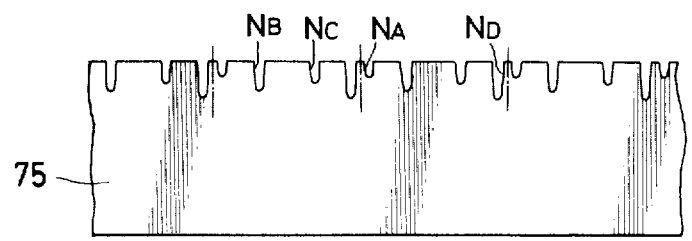

After the hub H has been retained on the cylinder 62, both the rotary cylinders 98 and 103 are actuated to integrally rotate the rotary cylinders by pairs 86A, 86C and 86B, 86D, respectively, by a desired angle in opposite directions so that the retainer pins 87 mounted on the rotary cylinders 86 are revolved about the hub H to twill the spokes S while maintaining them in a horizontal posture (See FIGS. 17, 19 and 21).

After the spokes S have been twilled (while maintaining them in a horizontal posture), the lifting cylinder 78 is actuated to move the retaining drum 75 upward (see FIG. 9) so that the spokes SC and SD are cradled and retained in the retaining grooves NC and ND of drum 75 and are disengaged from the retaining pins 87C and 87D simultaneously therewith.

It is to be noted at this time that the retaining drum 75 does not move up to the height at which the spokes S are fitted and retained in the aligned retaining grooves NA and NB, but merely moves up to a position wherein the ends of the spokes SC and SD, retained in the retaining grooves NC and ND, assume a height equalling the mid-position between the upper and lower flange portions of the hub H.

In this condition, the rotary cylinder 108 is actuated to rotate the cam ring 95 integrally with the outer drum 94 (see FIG. 20), whereby cam ends 90 of the retainer pins 87A and 87B are brought into engagement with the cam faces 96 of the cam ring 95 to withdraw the retainer pins 87A and 87B.

When the retainer pins 87A and 87B are withdrawn, the spokes SA and SB of which the ends have thus far been retained by the retainer pins 87A and 87B are disengaged and fall from the retainer pins 87A and 87B into the retaining grooves NA and NB positioned directly below the pins 87 and the spokes SA, SB.

SECONDARY CARRYING STEP

After the spokes S have been cradled and retained in the aligned retaining grooves N, another carrier mechanism 4', independently of the aforementioned carrier mechanism 4, retains the hub H and at the same time retains the spokes S in an obliquely-twilled posture. Then, the hub H is released from the retaining bodies 70 and is lifted and translated to the fastening mechanism 3.

This operation of retaining and carrying the hub H and spokes S by the carrier mechanism 4', as just mentioned above, is identical with that of the carrier mechanism 4 as previously described; and therefore, the operation of detailed parts thereof will not further be explained here.

FASTENING STEP

In the fastening mechanism 3 (see FIG. 24) before the combination of the hub H and spokes S is carried and rested on the mounting cylinder 128, the position of the rim R has accurately been determined by the locating pin 132, and the rim R has immovably been retained on the retaining bed cylinder 122 by means of the clamp elements 123 in a condition where the rim R is formed to be a true circle by the centering ring 139. The push-up elements 140 have been locked at the upper limit by the cam ring 142.

The combination of the hub H and spokes S retained in an obliquely twilled posture is carried to the fastening mechanism 3 held in a state as just mentioned. The hub H is aligned relative to the rim R such that a central portion of each spoke S comes into contact with the upper end of a push-up element 140 before the hub H is fully seated on the mounting cylinder 128.

When the combination of the hub H and spokes S is moved down so that the hub H is seated on the mounting bed cylinder 128 (in despite of the fact that the push-up element 140 is placed in contact with the central portion of the spoke S9, the spoke S, whose base end is fitted in the hub H while the outer end is held between a push plate 158 and a hook 155, is subjected by the push-up element 140 to an upwardly directed elastic deformation forming an arch, as a consequence of which the outer end of the spoke S is displaced towards the hub H by a distance in proportion to the amount of deformation.

Thus, the outer end of the spoke S, which is possibly jammed in the vicinity of the spoke receiving hole in the rim R if the spoke is not deformed, may be moved back because of such a deformation as described above; and hence, the spoke can be aligned to the spoke receiving hole in the rim R smoothly without being caught in the rim R.

After the hub H has been positioned on the mounting bed cylinder 128, the hub H is immovably retained on the mounting bed cylinder 128 by the retaining bodies 126, and at the same time, the cylinder 145 is actuated to rotate the cam ring 142, thus moving all of push-up elements 140 downward along the cam faces of the cam ring 142.

When the push-up force, which has been exerted on the central portion of the spoke S, is removed by the downward movement of the push-up elements 140, the spoke S is returned to linearity by the elasticity thereof so that the outer end of the spoke enters into the spoke receiving hole in the rim R.

Upon entry of the end of the spoke S into the spoke receiving hole in the rim R, the spokes S and hub H are released by the carrier mechanism 4' to allow the carrier mechanism 4' to be disengaged and withdrawn upwardly. Then the spokes S and rim R are nipple-fastened by means of the nipple drivers 138.

This nipple-fastening procedure by means of the nipple drivers 138 is carried out at every stop of intermittent rotation of the turntable 121. Thus, where spokes are thirty-six in number and nipple drivers 138 are four in number, nipple-fastening of all of spokes S to the rim may be accomplished by nine steps of intermittent rotation of the turntable 121.

Some spokes S released from being retained by the hook 155 and push plate 158 in the carrier mechanism 4 might have their ends positioned within the spoke receiving holes in the rim R in an extremely unstable condition which could conceivably hinder the nipple-fastening operation. However, each spoke S released from the hook 155 and push plate 158 remains immovably retained on the push-up element 140 by its own weight, so that even if there are some spokes S, which are slightly short in length so as not to allow the ends thereof, to be entered and positioned into the spoke receiving holes in the rim R, the nipple-fastening operation can smoothly be achieved without any inconvenience.

Incidentally, in carrying the combination of the hub H and spokes S from the drawing-up 1 step to the twilling 2 step, the end of a spoke S needs to be retained first by the retaining drum 38 and then by the retainer pin 87. Therefore, during movement in mechanism 4 in which the spoke S is retained by a hook 155 and push plate 158, it is desirable to contact the spokes slightly toward the hub. On the other hand, in carrying the combination of the hub H and spokes S from the twilling step to the fastening step, because the spoke S must be subjected to elastic deformation at the time of fastening, it is desirable that the spoke S is retained by the hook 155 and push plate 158 as close as possible to the outer end of the spoke S.

ALTERNATIVE EMBODIMENT

While the drawing up and twilling steps for spokes S are carried out in separate stations with a carrier mechanism interposed in the embodiment described above, the carrier mechanism may be dispensed within an alternative embodiment such that these two steps are accomplished in the same station as hereinafter described.

Many similar structures and operating steps exist between the first described and the alternative embodiment. These similarities are immediately recognizable. Therefore, many details of explanation are abbreviated in the ensuing text and the description of the first apparatus and method should be referred to if greater depth of explanation is required.

Within reference to FIG. 30, the appartus provides an arrangement, wherein the hub H with spokes S fitted therein is rotated at a desired speed to exert a sufficient centrifugal force on each of spokes S to thereby radially arrange the spokes S on the hub H. The spokes S thus radially drawn up are indivudually fitted and retained in spoke retainer pins 221, and the spoke retainer pins 221 with the spokes S retained thereon are rotated and displaced through a predetermined angle in a fixed direction about the hub H to twill the spokes S.

The apparatus comprises: a drawing-up mechanism 172 for retaining the hub H rested thereon; means for rotating the hub H at a fixed rotational speed to radially draw up the spokes fitted in the hub H; an installing and removing mechanism 174 for firmly and immovably retaining the hub H with spokes S fitted therein at a fixed location on the drawing-up mechanism 172; a drawing up and retaining mechanism 175 for retaining the spokes S, which have radially been drawn up on the hub H by the action of centrifugal force and for maintaining their radial posture with respect to the hub H; a twilling mechanism 176 for individually retaining ends of spokes S, radially drawn up on the hub H in rotating spoke retainer pins 221; a twilling operating mechanism 177 for rotating the spoke retainer pins 221, on which ends of the spokes are retained. These retainer pins 221 are rotated about the hub H through a fixed angle in a selected direction and the twilling operating mechanism 177 rotating a cam ring 225 in a fixed direction in order to disengage the spokes S retained on the spoke retainer pins 221 therefrom; and a twilling and retaining mechanism 178 for retaining the swilled spokes S while maintaining their twilled posture and retaining the ends of the spokes S in a manner so that ends rest along a single circumferential line.

The various mechanisms, which constitute the alternative embodiment, are described hereinafter.

DRAWING-UP MECHANISM 172

(See FIGS. 30 through 36)

The drawing-up mechanism 172 is a station wherein the hub H is rested and retained thereon, is rotated at a fixed high speed to allow a centrifugal force to act upon spokes S fitted in the hub H so tht the spokes S are radially drawn up. A frame 179, serving as a mounting base according to the instant apparatus, has an upper surface plate, on which a main shaft 186 is supported rotatably and movably up and down in a vertical posture extending through the upper surface plate. On the main shaft 186 a drive pulley 182 is mounted not rotatably but movably up and down, which pulley 182 is connected to a motor 181 secured to the frame 179.

Also, on the upper end of the main shaft 186 is mounted a mounting jig 187 on which the hub H is rested and retained in a fixed angular position and concentric with the main shaft 186.

An element 188, which is attached to the mounting jog 187 in a parasol fashion, is provided to prevent dangling of spokes S, prior to rotation when they are prone to be entangled.

At the lower end of the main shaft 186 and downwardly protruded from the upper surface plate of the frame 179 is secured a step 191, which connects a part of the installing and removing mechanism 174 to a coupling 193 fixedly mounted on the upper end of a piston 190 of a lifting cylinder 189 which is secured to the bottom plate of the frame 179.

Figure 34:
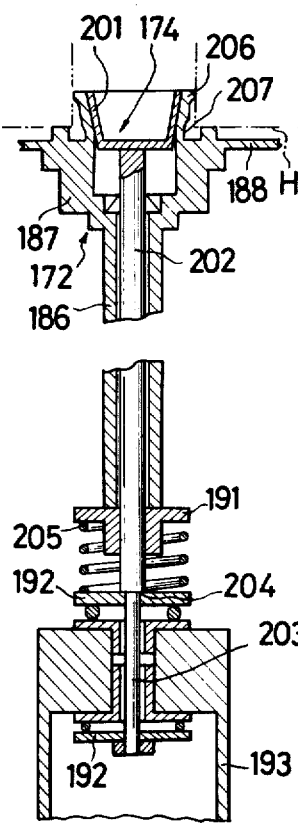
Figure 35:
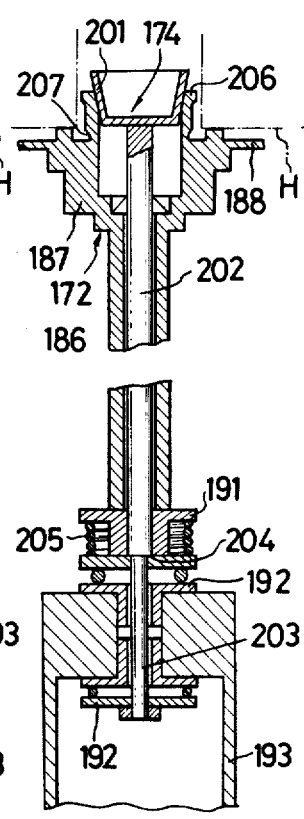
Figure 36:
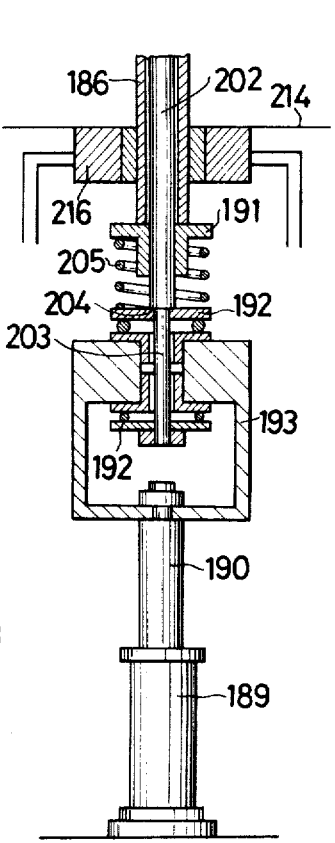
Figure 37:
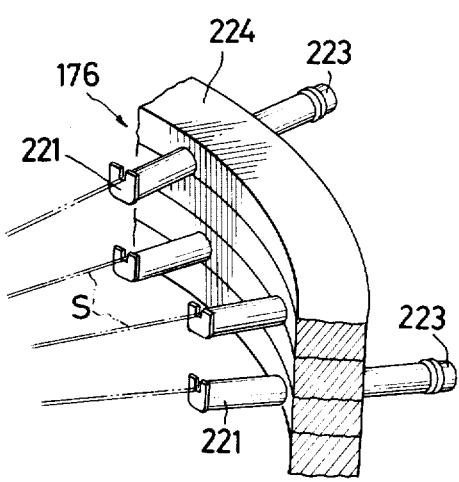
Figure 38:
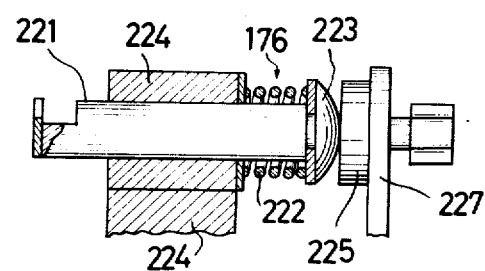
Figure 39:
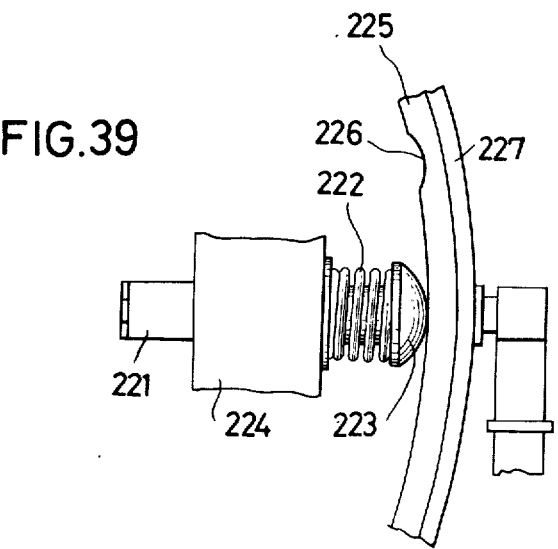
Figure 40:
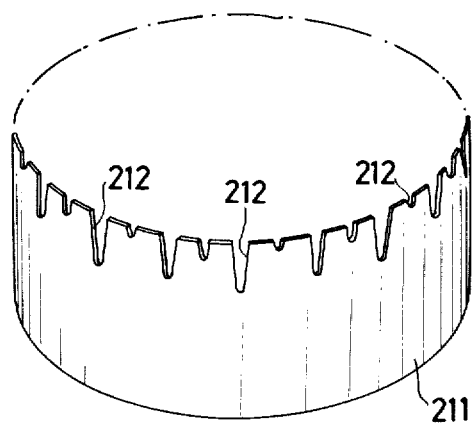
Figure 41:
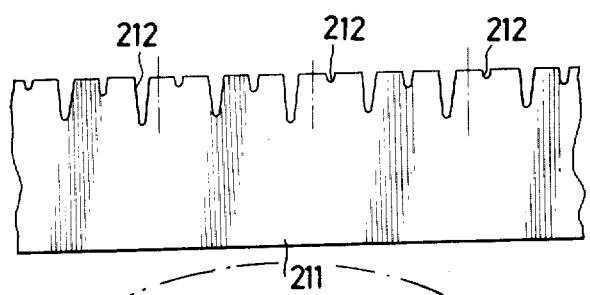
Figure 42:
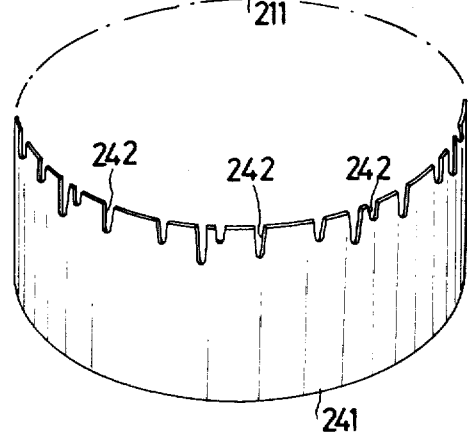
Figure 43:
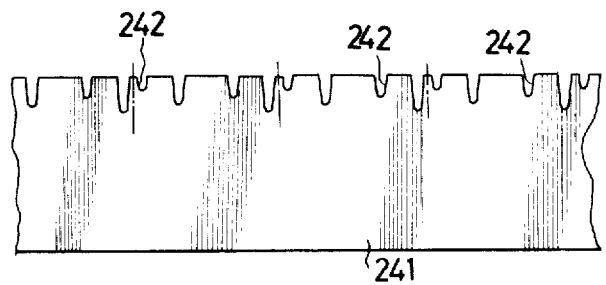
Figure 44:
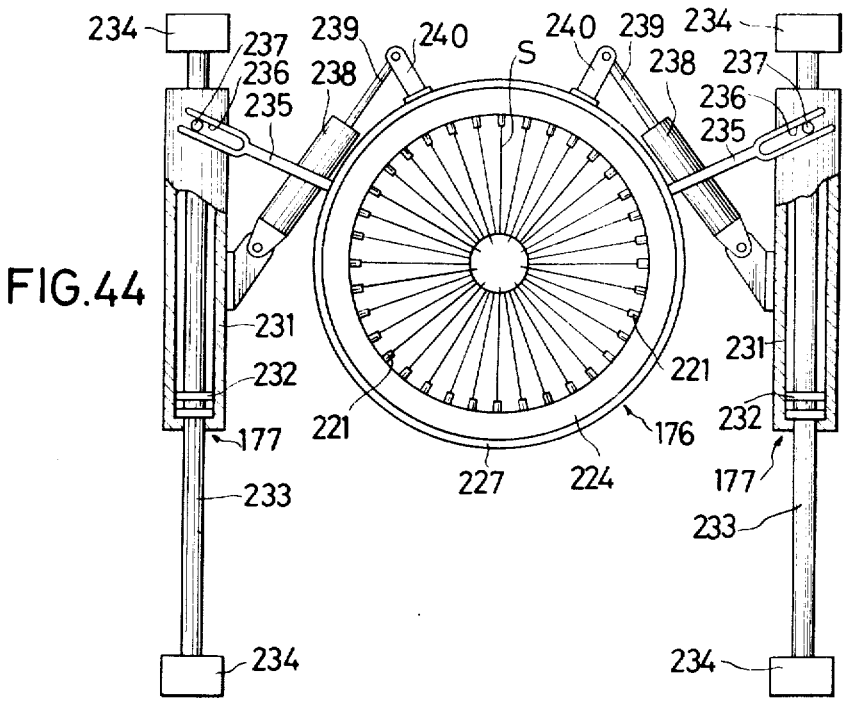

Particularly, see FIGS. 34 through 36 where a fixed lower end portion 203 of a collet shaft 202, coaxially fitted within the main shaft 186, is rotatably mounted through bearings 192, in the coupling 193 which is fixedly mounted on the upper end of the piston rod 190. A spring 205 fitted around the collect shaft 202 is retained between the step 191 and the upper bearing 192 positioned on the upper surface of the coupling 193.

If the main shaft 186 is rotated, this rotation of the main shaft 186 is transmitted to the bearing 192 pressed by the spring 205 but rotation is not transmitted to the coupling 193.

The drive pulley 182 mounted on the main shaft 186, rotatably and vertically movable, is secured through a frame 180 to the upper surface of the frame 179 rotatably (but not movably up and down) and can be rotated about the main shaft 186 by the motor 181 secured to the frame 179. Locating holes 183 are formed in a equally-spaced relation in the peripheral surface of the drive pulley 182 so that when a locating pin 184, which is the piston rod 184 of a locating cylinder 185 secured to the frame 180, is fitted into the locating hole 183, the position for locking the rotation of the drive pulley 182, and the position for locking the rotation of the hub H retained on the mounting jig 187, may be determined.

The spokes S, fitted in the hub H, are divided into four groups different in their vertical level along the axis of the hub H as described above. Also, the spoke retainer pins 221, which retain the spokes S, are set in their mounting level in registration with the height position of the corresponding spokes S.

Also, for example, spoke receiving holes formed in the hub H or positioning keyways formed in the internal surface of a barrel portion of the hub H may be utilized to accurately determine the angular position of the hub H on the mounting jig 187.

INSTALLING AND REMOVING MECHANISM 174

(See FIGS. 30 through 36)

The installing and removing mechanism 174 is a device whereby the main shaft 186 is moved up and down; that is, a lifting cylinder 189 is actuated to immovably retain the hub H on the mounting jig 187 or to release the retaining force thereof. The mechanism 174 provides an arrangement in which an inverted circular truncated cone-shaped collet chuck 201 is positioned inwardly of pressing elements 206 in a manner so as to urge the tapered outer peripheral surface of the collet chuck against the pressing elements 206 disposed on the mounting jig 187 through a flexible springing portion 207. When the collet chuck 201, integral with the collet shaft 202, is moved down, it forces, by virtue of the tapered outer surface of the collet chuck 201, the pressing elements 206 against the inner peripheral surface of a barrel portion of the H rested on the mounting jig 187, thus immovably retaining the hub H on the mounting jig 187.

The lower end of the collet shaft 202 extends through a step 191 and protrudes downward from the interior of the main shaft 186; the lower end of the collet shaft 202 having a fixed lower end length 203 slightly reduced in diameter commencing with a step portion 204.

This fixed lower end length 203 is a portion which rotatably, but not vertically displaceably, connects the collet shaft 202 to the coupling 193 through the bearings 192, and such a connection is achieved by fastening the bearings 192, already mounted on the coupling 193, between the stepped portion 204 and a nut to be threaded onto the lower end of the shaft segment 203.

A collet spring 205 is retained between the step 191 and the upper bearing 192 in a position where the spring is protruded downwardly below the main shaft 186.

This collet spring 205 pushes the step 191 and the main shaft 186 upwardly relative to the coupling 193. This force of the collet spring 205 is extremely powerful and is the driving force which retains the hub H in cooperation with the collet chuck 201 and the flexible pressing element 206.

DRAWING UP AND RETAINING MECHANISM 175

(See FIGS. 30 through 33 and FIGS. 40 and 41)

The drawing-up and retaining mechanism 175 is a station wherein, after the spokes S have been rotated at a fixed speed and radially drawn up, the spokes S can be retained in a radially drawn-up posture after rotation ceases. In this mechanism, a drawing-up drum 211, which is supported on the main shaft 186, not rotatably but vertically movable, has an upper edge formed with retaining grooves 212 having a depth corresponding to the height of individual spokes S when radially drawn up.

The drawing-up drum 211 is fixedly mounted on the upper end of a drum shaft 213, which is of cylindrical shape with the main shaft 186 coaxially housed therein, and the drum 211 has an upper edge formed with the retaining grooves 212 in equally spaced relation having the depth corresponding to the height position of the spokes S radially drawn up.

In the case of the illustrated embodiment, since the spokes S fitted in the hub H have four different height positions, the retaining grooves 212 also have four different depths. Further, since the spokes S are fitted in the flange portions of the hub H in equally-spaced relation, the adjacent retaining grooves 212 are equally spaced.

The drum shaft 213, with the drawing up drum 211 secured to the upper end thereof, is fitted to the main shaft 186 not rotatably but movably up and down, and the aforementioned connection between the drive pulley 182 and the main shaft 186 is accomplished through this drum shaft 213. That is, the drive pulley 182 is directly mounted on the drum shaft 213 to provide nonrotation but vertical movement between the drive pulley 182 and the drum shaft 213. At the lower end of the drum shaft 213, a drum piston 215 is integrally mounted to form a cylinder mechanism in combination with the drum cylinder 214 secured to the lower surface of the drive pulley 182.

With this arrangement, pressurized oil supplied into the drum cylinder 214 causes the drawing up drum 211 to move up and down with respect to the hub H retained on the mounting jig 187. This drum cylinder 214 is provided with a rotary change-over valve 216 so that the pressurized oil may be supplied into the drum cylinder 214 irrespective of the rotation of the drum shaft 213 or the drum cylinder 214.

Because no rotation is provided between the main shaft 186 and the drum shaft 213, the drawing-up drum 211 is rotated integrally with the hub H retained on the mounting jig 187. As a consequence, the retaining grooves 212 and the spokes S are not rotated and displaced relatively; and hence, it is necessary to accurately determine the angular position of the hub H when the hub H is first mounted on the mounting jig 187.

TWILLING MECHANISM 176 ( (See FIGS. 30 through 33 and FIGS. 37 through 39)

The twilling mechanism 176 is a device wherein ends of spokes S, radially drawn up, are retained in their height position. The spokes S retained by the height position are then rotated through a fixed angle in a fixed direction with respect to the hub H so as to be twilled, and the twilled spokes S are then transferred to the twilling and retaining mechanism 178. Also, the mechanism 176 provides spoke retainer pins 221 which support the ends of the spokes S, radially drawn up, from below and which pins 221 are divided into groups by the height position of the spokes S. The spoke retainer pins 221 are fitted in twilling rings 224 differing by height and the twilling rings 224 are rotatably placed, one upon another, about the hub H.

These twilling rings 224 are placed vertically one upon another, rotatably about the hub H, through a ring base on a mounting bed 230 secured to the upper surface of the frame 179 and about the axis of the main shaft 186. The twilling rings 224 each having its internal diameter of a value such that the rings do not interfere with the ends of the spokes S.

In the illustrated alternative embodiment, there are four twilling rings, and the following description is given assuming, for example, that there are four twilling rings 224. Each ring 224 has the desired number of spoke retainer pins 221 secured thereto, inwardly protruded, so that the ends of the spoke retainer pins 221, formed with retaining grooves, support the end portions of the spokes S radially drawn up.

Among these spoke retainer pins 221 mounted on the twilling rings 224, the spoke retainer pins 221 (particularly see FIGS. 37 through 39) mounted on the upper two levels of the twilling rings 224 are radially slidably fitted in the twilling rings 224. Between the sliding and enlarged rear end 223 (used as a cam follower) protruded outwardly of the twilling ring 224 and the twilling ring 224, is retained a compression spring 222 thereby always exerting a withdrawing force upon the spoke retainer pin 221.

Outwardly of the upper two levels of twilling rings 224, two retainer rings 227 are placed one upon another on a mounting bed 230 through a ring base 229 individually rotatably about the hub H similarly to the twilling rings 224. The retainer rings 227 have a cam ring 225 secured to the inner peripheral surfaces thereof and pressing the spoke retainer pins 221 inward toward the hub H.

The sliding surface of a cam ring 225, against which the sliding rear end 223 of the spoke retainer pins 221 are always pressed by the action of the spring 222, is partly formed with a concave cam faces 226 so that when the cam ring 225 is rotated and displaced with respect to the spoke retainer pin 221, it allows the sliding rear end 223 to index into the cam face 226. The spoke retainer pin 221 is moved back thereby.

The spoke retainer pin 221 is moved back in the amount such that the end of the spoke retainer pin 221 is positioned outwardly and apart from the end of the already twilled spoke S. Hence, when the spoke retainer pin 221 is moved back, the spoke S, which has so far been retained on the spoke retainer pin 221, will fall due to its own weight.

TWILLING OPERATING MECHANISM 177

(See FIGS. 30 through 33 and FIGS. 44 through 46)

The twilling operating mechanism 177 is a device wherein the twilling rings 224 and the retainer rings 227 are rotated by a fixed amount about the hub H, and the mechanism 177 essentially comprises a pair of twilling cylinders 231 mounted on the mounting bed 230 and a pair of cam ring cylinders 238 whose base ends are secured each to one of the twilling cylinders 231.

Each twilling cylinder 231 is arranged with the guide piston rod 233 extending from opposite ends and the ends of piston rod 233 are fixed by holding elements 234, so that the cylinder 231 is positioned in the vicinity of the retainer ring 227.

With this arrangement, the combinations of the piston 232 and the guide piston rod 233 do not move, but actuation with pressurized oil causes the twilling cylinder 231 to move.

Also, the twilling cylinder 231, which moves along the guide piston rod 233, has a guide pin 237 protruded therefrom, which is loosely fitted into a guide groove 236 formed in one extremity of a rotary arm 235 which arm 235 extends through the retainer ring 227 and is secured at the other end to the twilling ring 224.

The rotary arms 235 are mounted on two alternately arranged twilling rings 224 among the four twilling rings 224 placed one upon another as described above. Due to a loose fit of the guide pin 237 into the guide groove 236, the arms 235 are rotated about the hub H integrally with the twilling rings 224 when he twilling cylinder 231 is moved along the guide piston rod 233.

Further, the base end of a cam ring cylinder 238 is pivotably mounted on the twilling cylinder 231, and the extremity of the piston rod 239 of the cam ring cylinder 238 is connected through an attachment element 240 to one of two retainer rings 227 placed one upon another.

With this arrangement, when only the twilling cylinder 231 is actuated and the cam ring cylinder 238 is not actuated, the twilling ring 224 and the cam ring 225 will rotate together with the same amount of rotation and in the same direction. However, when only the cam ring cylinder 238 is actuated and the twilling cylinder 231 is not actuated, only the cam ring 225 will rotate.

As previously noted, there are two twilling cylinders 231 and two cam ring cylinders 238. One twilling cylinder 231 is connected through a rotary arm 235, to the first and the third twilling rings 224 from the top; the other twilling cylinder 231 is connected through a rotary arm 235 to the second and the fourth twilling rings 224; and similarly, one cam ring cylinder 238 is connected to the upper retainer ring 227;and the other cam ring cylinder 238 is connected to the lower retainer ring 227.

TWILLING AND RETAINING MECHANISM 178

(See FIGS. 30 through 33 and FIGS. 42 and 43)

The twilling and retaining mechanism 178 is a device wherein spokes, twilled while maintaining their horizontal posture with ends thereof retained on spoke retainer pins 221, are retained in a twilling posture but with the ends of the spokes S substantially opposed aligned along a single circumferential line. The mechanism 178 provides an arrangement in which a cylindrical twilling drum 241 has its upper edge formed with retaining grooves 242 corresponding in position to the positions of twilled spokes after the ends have been aligned to lie on a desired circle about the center axis of the hub H. The twilling drum 241 is moved upwardly relative to the hub H, retained on the mounting jig 187, so as to transfer the spokes S retained on the spoke retainer pins 221 to the twilling drum 241.

Because the cylindrical twilling drum 241 is secured to the sliding ring body 243 slidably connected around the drum shaft 213, the twilling drum 241 may be moved up and down relative to the drum shaft 213 when the sliding ring body 243 is moved vertically relative to the main shaft 186.

Pivotally mounted on the sliding ring body 243 is an end of an oscillating arm 247, the base end of which is rotatably connected to the upper end of a piston rod 245 of a lifting cylinder 244 fixed on the upper surface plate of the frame 179; and the central portion of the arm 247 is rotatably mounted on the upper end of a fulcrum rod 246 uprightly mounted on the frame 180.

When the lifting cylinder 244 is actuated, the twilling drum 241 is moved up or down along the main shaft 186 as the oscilling arm 247 pivots about the upper end of the fulcrum rod 246.

Because the twilling drum 241 is designed so that the retaining grooves 242 are accurately positioned so as to support the twilled spokes S and positively maintain their positional relationships, the twilling drum 241 is prevented from being rotated and displaced in the illustrated embodiment, by fitting a linear rod-like guide bar 248, uprightly mounted on the immovable bed frame 180, into a guide cylinder 249 integrally suspended from the twilling drum 241.

It should be noted that since the retaining grooves 242 formed in the upper end edge of the twilling drum 241 have been designed in their angular position and depth so as to support the already twilled spokes S, (FIGS. 42 and 43) spacings between the adjacent retaining grooves 242 are varied depending upon the diameter of the twilling drum 241. The depth of the retaining grooves 242 and the position thereof must be selected so that the ends of spokes S retained on the twilling drum 241 are aligned to a single periheral line, i.e., the circle where the wheel rim will later be connected.

Operation of the apparatus of this alternative embodiment is as follows with reference to FIGS. 30–46:

First, the lifting cylinder 189 is actuated to push up the main shaft 186 to its upper limit position and to raise a cup ring 193 against the spring 205 until the upper bearing 192 comes into contact with the step 191.

In this condition, the main shaft 186 and thus the mounting jig 187 is in its upper limit position, and the collet chuck 201 integral with the collet shaft 202 is pushed up by the cup ring 193 and moves up with respect to the mounting jig 187 (FIG. 35).

In this condition, the main shaft 186 and thus the mounting jig 187 is in its upper limit position, and the collet chuck 201 integral with the collet shaft 202 is pushed up by the cup ring 193 and moves up with respect to the mounting jig 187 (FIG. 35).

Accordingly, the oscillating pressing members 206 are positioned against a smaller diameter portion of the collet chuck 201 so that the members 206 move inwardly via the action of the spring portion 207.

Then, the hub H with the spokes S fitted loosely thereon is rested on the mounting jig 187 without being hindered by the oscillating pressing members 206 since the latter are inwardly displaced.

After the hub H has been rested on the mounting jig 187, the lifting cylinder 189 is actuated to lower the cup ring 193 until the latter assumes a position shown in FIG. 34 (from a state shown in FIG. 36) to powerfully force the pressing member 206 against the inner peripheral surface of a barrel portion of the hub H. This force is produced by the collet chuck 201 with the aid of the collet spring 205, thereby immovably retaining the hub H on the mounting jig 187.

After the hub H has been retained on the mounting jig 187, the motor 181 is actuated to rotate the drive pulley 182 along with the main shaft 186. As a consequence, a sufficient centrifugal force is exerted upon the spokes S placed on the hub H to horizontally and radially extend (drawn up) the spokes S as shown in FIG. 30.

When the spokes S have radially been drawn up with the motor 181 continuously operated, oil pressure is fed through the rotary change-over valve 216 into the drum cylinder 214 to exert an upward force upon the drum shaft 213 through the drum piston 215, whereby the drawing-up drum 211 is moved up while being integrally rotated with the main shaft 186.

Figure 31:
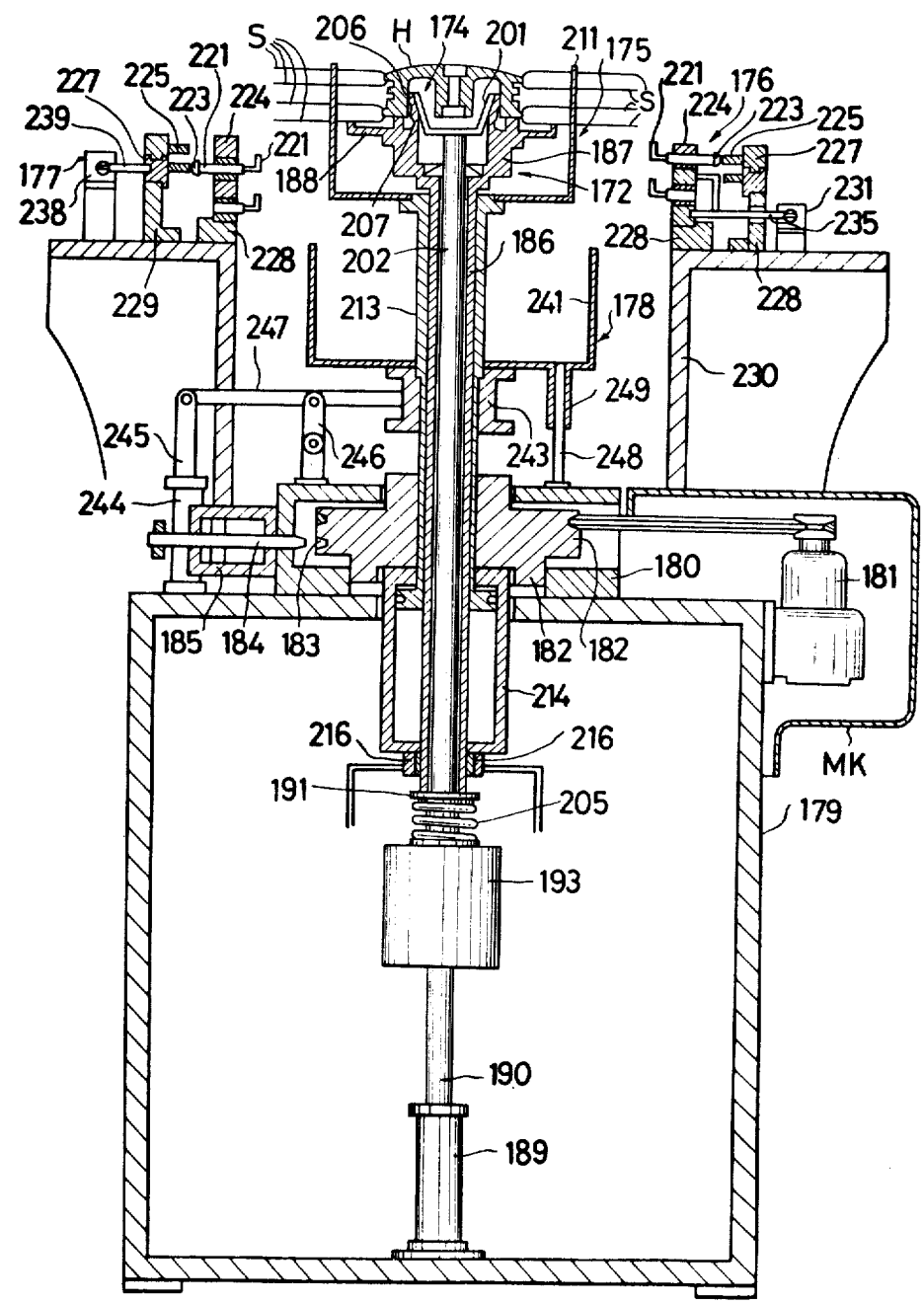

Because the drawing up drum 211, which moves up along the main shaft 186, is rotated at the same speed as that of the main shaft 186 and the spokes S, the retaining grooves 212 formed in the drawing-up drum 211 and the spokes S are fixedly aligned with each other relative to the rotational direction. Because of this, when the drawing up drum 211 moves up, the spokes S are received and supported in the retaining grooves 212 (FIG. 31).

After the spokes S have been received into the retaining grooves 212 (upon upward movement of the drawing-up drum 211), the motor 181 is stopped. When rotation of the drive pulley 182 is sufficiently reduced in speed due to friction, the locating cylinder 185 is actuated to advance the locating pin 184 into the locating hole 183 and thus the hub H and the drawing-up drum 211 are locked in a desired angular position.

Then, after the main shaft 186 has been stopped, the lifting cylinder 189 and the drum cylinder 214 are actuated to lower the mounting jig 187 and the drawing up drum 211 simultaneously at the same speed to their lower limit position.

Figure 32:
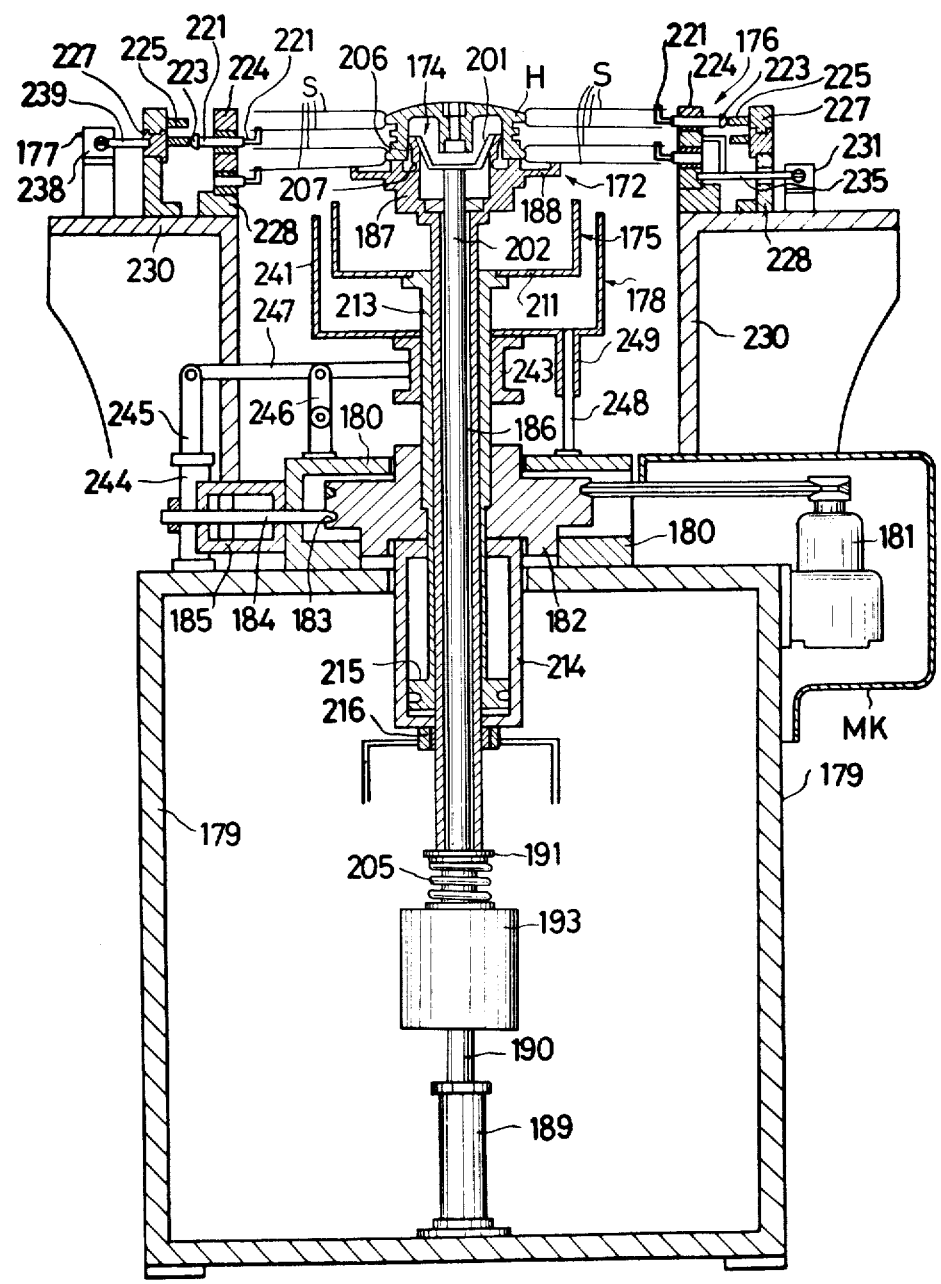

In this downward movement to the lower limit of the mounting jig 187, the extended ends of the radially and horizontally disposed spokes S are received in the ends of the spoke retainer pins 221, and the drawing-up drum 211 moves down to a position where the spokes S are upwardly and fully disengaged from the retaining grooves 212 (FIG. 32). For this purpose, the mounting jig 187 completes its downward movement earlier than that of the drawing up drum 211.

It will be understood that when the spokes S, radially and horizontally retained on the drawing-up drum 211, are moved down, the spoke retainer pins 221 in the twilling mechanism 176 are aligned in a fixed position so that each pin 221 supports an end of a spoke S. The insertion of the locating pin 184 into the locating hole 183 described above assures this alignment.

After the tips of radially and horizontally disposed spokes S have been retained (FIG. 37) on the spoke retainer pins 221 (see FIGS. 32 and 44), both the twilling cylinders 231 are moved forward (downward when comparing FIGS. 44 and 45) to twill the spokes S while maintaining their horizontal posture.

Figure 45:
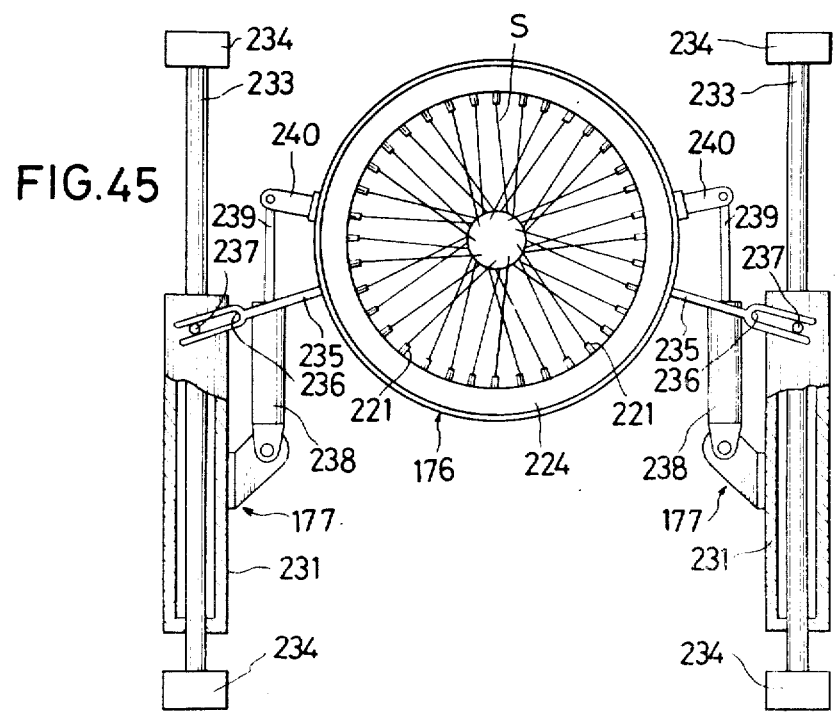

The first (highest level) and the third twilling rings 224 are rotated clockwise through an angle of 40°, whereas the second and the fourth twilling rings 224 are rotated counter-clockwise through the angle of 40°, whereby the spokes S are twilled while maintaining their horizontal posture, as shown in FIG. 45. Please note that this example, as before, is based upon thirty-six spokes S.

Figure 33:
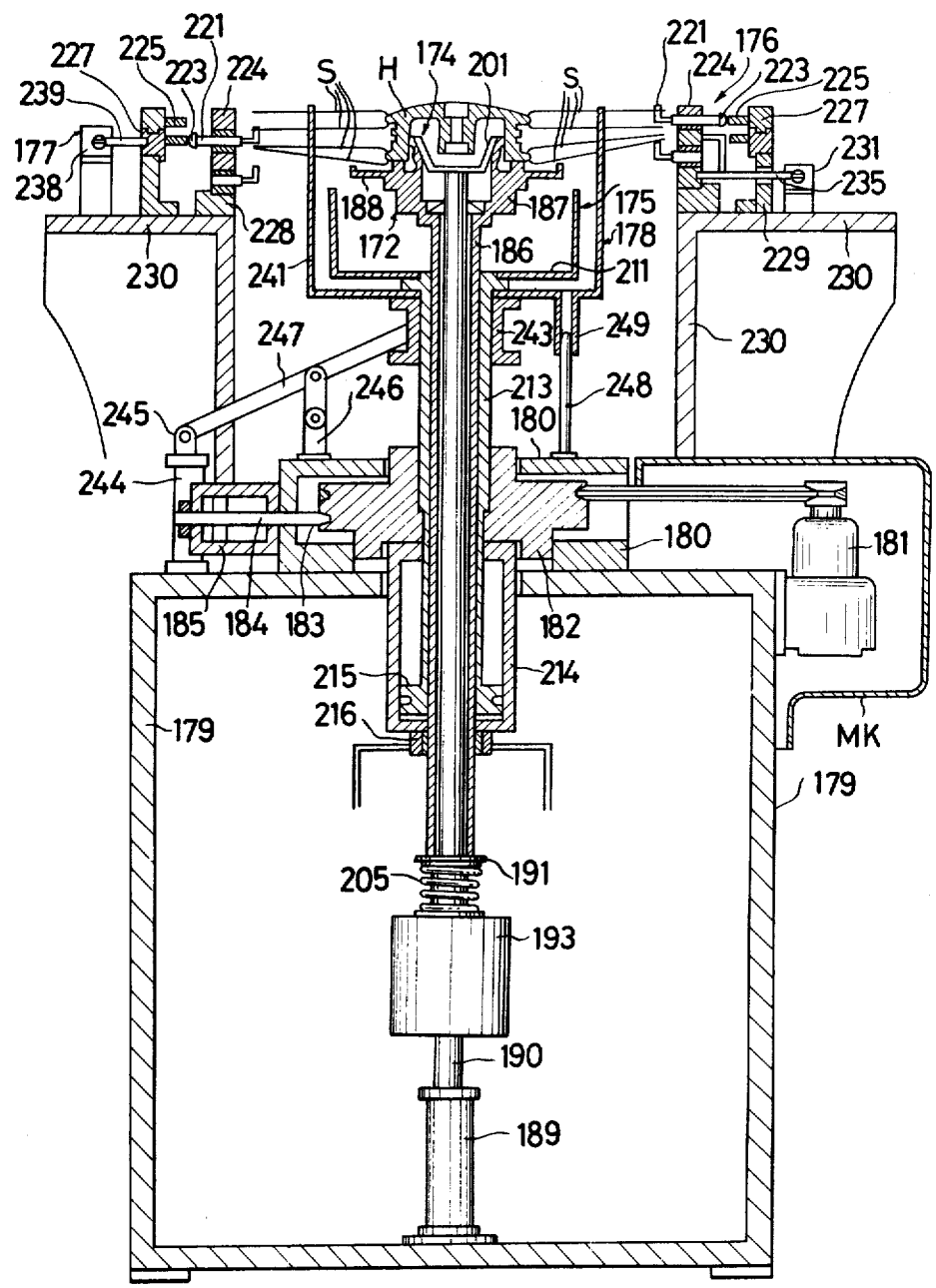

After the spokes S have been twilled while maintaining their horizontal posture, the lifting cylinder 244 is actuated to retract the lifting rod 245) to raise the twilling drum 241 to its upper limit as a consequence of which the spokes S retained on the spoke retainer pins 221, which are mounted on the third and fourth lowest twilling rings 224, are transferred to the retaining grooves 242 as shown in FIG. 33. Namely, the spokes S in the lower two stages are retained on the twilling drum 241 in a posture where the ends thereof are aligned along a single circumferential line.

Figure 46:
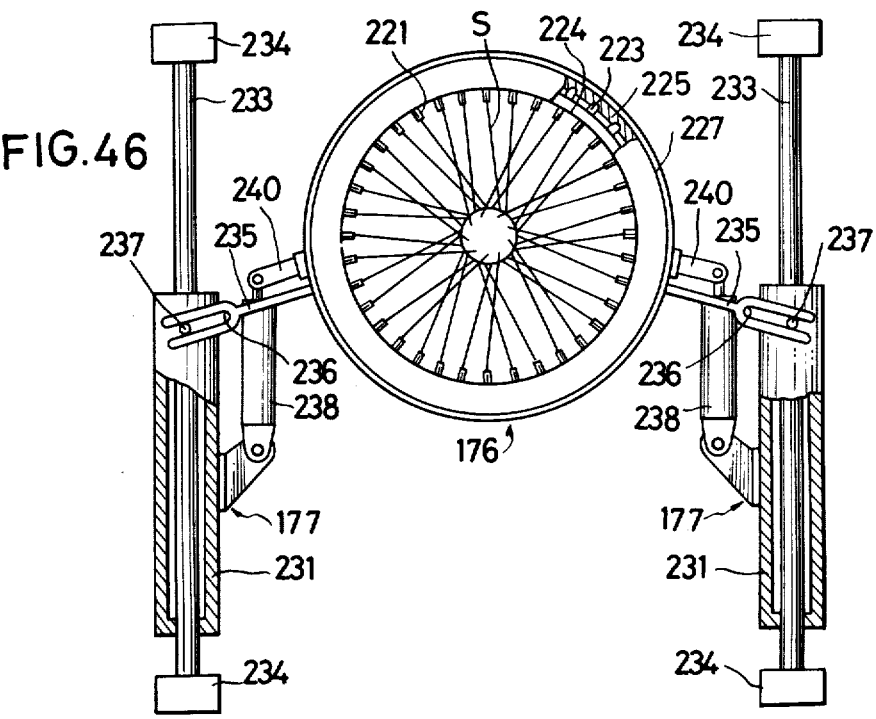
Figure 47:
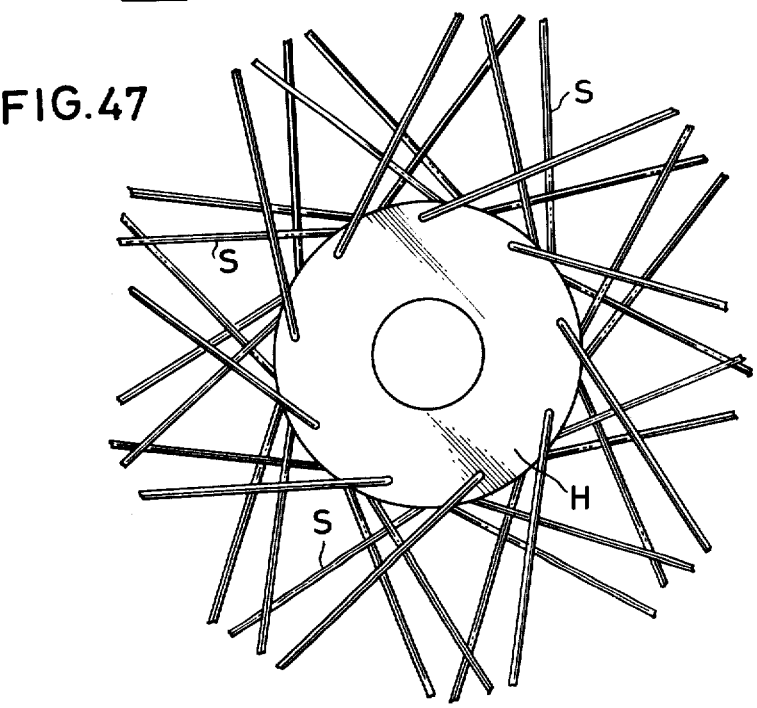

After the spokes S in the lower two stages have been shifted to the twilling drum 241, that is, after the twilling drum 241 has reached its upper limit position, the cam ring cylinders 238 are actuated (see FIG. 46). Actuation of the cylinders 238 causes the retainer rings 227 with the attached cam rings to rotate relative to the upper twilling rings 224. Thus, the sliding rear ends 223 (FIGS. 38, 39) of the spoke retainer pins 221 mounted on the two upper twilling rings 224 extend because of spring 222 into the retreating cam surfaces 226 of the cam rings 225 thereby withdrawing the spoke retainer pins 221 away from the hub H. As a consequence, the upper spokes S fall due to their own weight and are received into the retaining grooves 242 of the twilling drum 241 positioned directly below the spoke S.

It is to be noted that the ends of the spokes S thus received by falling into the retaining grooves 242 are aligned to the same circumferential line to which the other ends of spokes S previously retained in the retaining grooves 242 are aligned.

The combination of the spokes S thus twilled by the alternative apparatus and the hub H is conveyed by means of a suitable carrier mechanism to a fastening station as in the first described embodiment where the combination of the spokes S and the hub H is nipple-fastened to the rim while maintaining the spokes S in a twilling posture.

In an alternative embodiment of the twilling mechanism 176, the spoke retainer pins 221 need not be mounted in the upper two twilling rings 224 in a slidable manner as described above. The reason for allowing the spoke retainer pins 221 to slidingly move back is to transfer the spokes S from the spoke retaining pins 221 to the retaining grooves 242 in the twilling drum 241 below. By increasing the distance of upward movement of the twilling drum 241, all four levels of the spokes S can be shifted from the spoke retainer pins 221 to the retaining grooves 242. Thus, the spoke retainer pins 221 in the upper two stages need not be slidable; and in addition, the cam rings 225, retaining rings 227 and cam ring cylinders 238 may be eliminated to afford an advantage that the apparatus is simplified in construction.

It will further be noted that for the motor 181, a two-speed motor may be used, whereby in the step of drawing up, the motor 181 is driven at a high speed to radially draw up the spokes S, and when the main shaft 186 is stopped, the motor 181 is switched to a mode of low speed so that the motor 181 as a driving source may act on a braking device to thereby extensively simplify the structure of a braking mechanism (not shown) for the main shaft 186.

ALTERNATIVE SPOKE INSERTING APPARATUS

In the embodiments as previously described, the spoke ends are automatically inserted into the spoke receiving holes of the rim in such a manner that the spokes S are subjected to elastic deformation beforehand. This method utilizes the flexibility which is displayed by the spokes so that the spoke ends are positioned within the inner periphery of the rim, after which the spokes S are permitted to be returned to their original unflexed configuration which extends them towards the rim, whereby the spokes S are inserted into the spoke receiving holes. This is, however, a somewhat forcible procedure, which cannot always be applied to all kinds of spokes because of limitations in spoke size, length and material.

With this in mind, an inserting apparatus and procedure has been developed, which requires no specific force or forcibleelastic deformation in order to locate the spoke ends within the inner periphery of the rim prior to insertion into the spoke receiving holes in the rim. This newly developed procedure and apparatus is described hereinafter.

In brief, there is provided a mechanism wherein spokes attached in an inclined posture along the peripheral edges of the hub are further inclined to displace the positions of spoke ends towards the hub. The rim is translated simultaneously with the returning operation of the spokes from the excessively inclined posture, whereby the spoke ends, which move in a direction away from the hub as the spokes rotate at the hub, are inserted into spoke receiving holes in the rim without bending.

Figure 48:
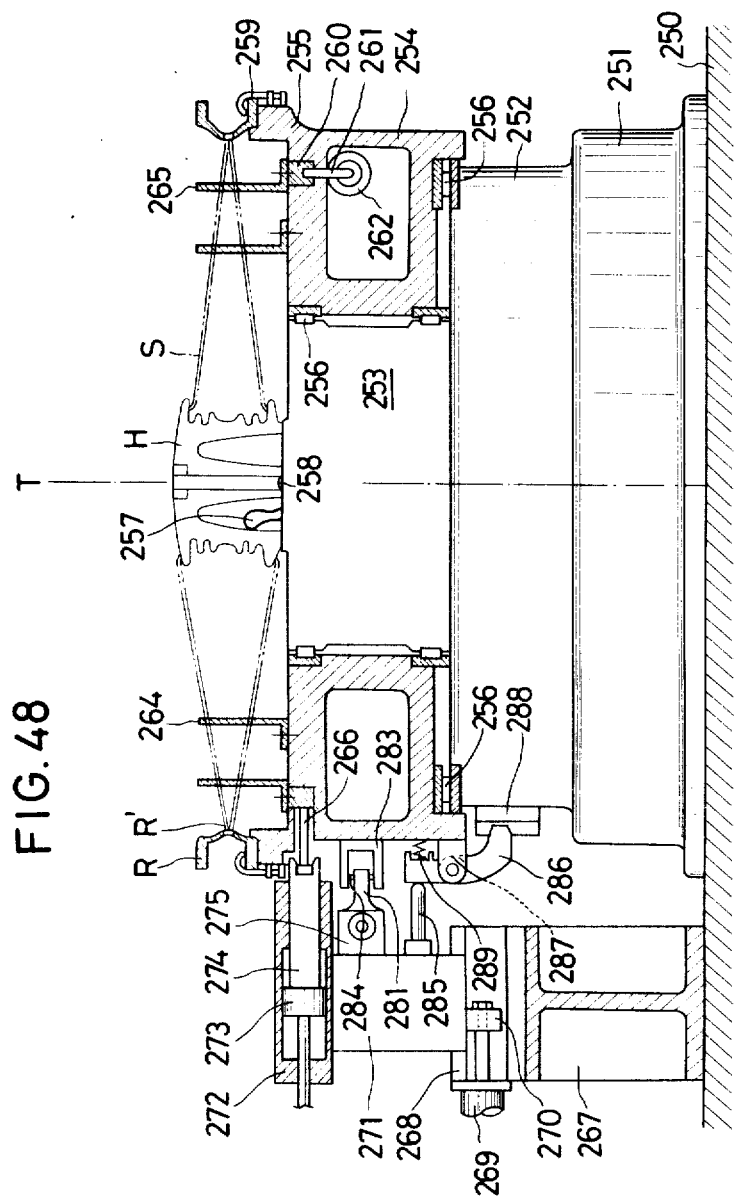

With reference to FIG. 48, the numeral 252 shows a circular, stepped index table, which forms the body of a fastening mechanism mounted on a base bed 251 immovably secured to a base plate 250. The index table 252 is intermittently rotated at a center angle determined according to the number of spokes S fitted in the hub H. There is a centering pin 258 mounted on the center axis T of the upper surface of the table, said axis T being the axis of rotation, which pin 258 is received into the center hole in the hub H rested on the index table 252 to thereby position the hub H concentrically on the index table 252. The hub H rested on the index table 252 is immovably retained by means of a retainer 257 enclosed in the index table 252.

A ring-like rotary table 254 is rested on the step of the index table 252, the rotary table 254 being rotatable about the center axis T through a bearing 256.

The rotary table 254 has various parts mounted thereon or various parts connected thereto; and therefore, the rotary table 254 is constructed of a ring having an increased thickness in order to provide sound support.

The upper portion 253 of the index table 252 on which the hub H is rested is nested within the central circular opening of the rotary table 254 such that portion 253 acts as a rotary shaft for the rotary table 254 and the upper surface of the resting portion 253 is aligned with the upper surface of the rotary table 254.

Coaxially arranged about the center axis T and the upper surfaces of the rotary table 254 are cylindrical-shaped retaining drums 264 and 265, which are low in height. Also, at the peripheral outside, upper edge of the rotary table 254 is an integral peripheral ring portion 255 for immovably retaining the rim R in conjunction with a multitude of retainer hoods 259.

Figure 50:
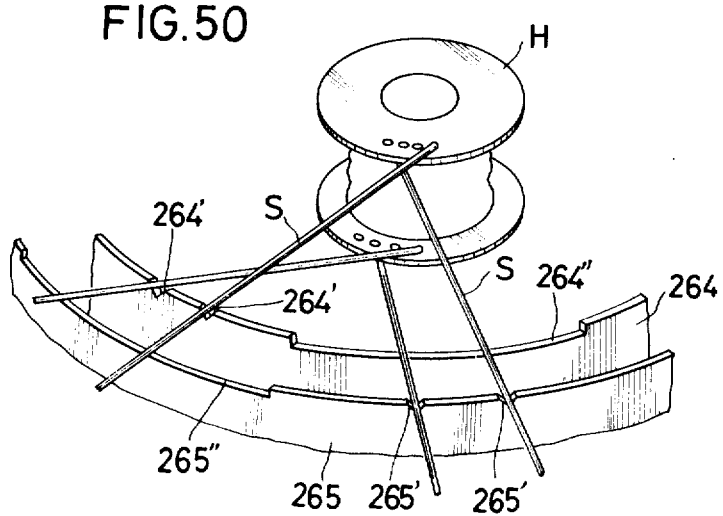

The function of the retaining drums 264 and 265 (see FIG. 50) is to retain spokes S fitted in the hub H while maintaining their desired posture. These low drums are formed at the upper edges with engaging grooves 264' and 265', respectively, into which the spokes S immovably engage due to their own weight, and are also formed with escapes 264" and 265", respectively, so as to prevent the spokes S, which are not retained on the other retaining drum 265 from being caught and vice versa.

The one (drum 265, in case of the illustrated embodiment FIG. 48) of these retaining drums 264 and 265 is rested and fixed in a sliding ring 260, which is slidably placed within a peripheral groove formed along a circle about the center axis T in the upper surface of the rotary table 254, so that the drum 265 may rotatably be displaced with respect to the rotary table 254.

Figure 51:
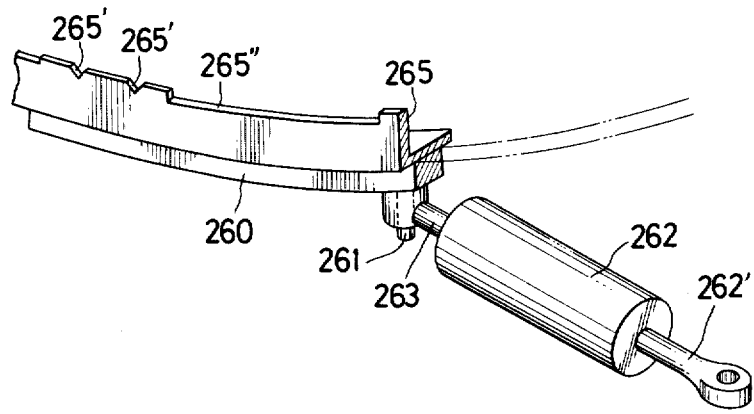

Secured to the sliding ring 260 with the retaining drum 265 rested and fixed thereon is a connecting pin 261 (see FIG. 51), which extends through a hollow portion of the rotary table 254 passing through a slot formed in an upper plate portion of the rotary table 254, and at the lower end of the connecting pin 261 is connected to a piston rod 263 of a rotary cylinder 262 whose base end is rotatably secured by a bracket 262' to the rotary table 254 so that when the rotary cylinder 262 is actuated, the sliding ring 260 and the retaining drum 265 are rotated with respect to the rotary table 254.

Independently of the connecting pin 261, the sliding ring 260 also has a stop pin 266 mounted thereon and outwardly protruded extending through a slot formed in an outer peripheral surface of the rotary table 254.

On the rotary table 254 is detachably mounted a suitable means which allows the rotary table 254 to rotate in order to rotate and displace the rim R and the retaining drums 264, 265 with respect to the hub H.

In the case of the illustrated embodiment (FIG. 48), a means for rotating the rotary table 254 is designed so that a mounting bed 267 is fixed on a base plate 250 in the vicinity of the index table 252. A feed unit 271 is slidably rested on a guide rail 268 mounted on the mounting bed 267 and directed towards the center axix T, and a piston rod of a feed cylinder 269 fixed on the mount bed 267 is connected to a bracket 270 protruded from the undersurface of the feed unit 271 so that the feed unit 271 may be moved radially toward the center axis T.

Figure 49:
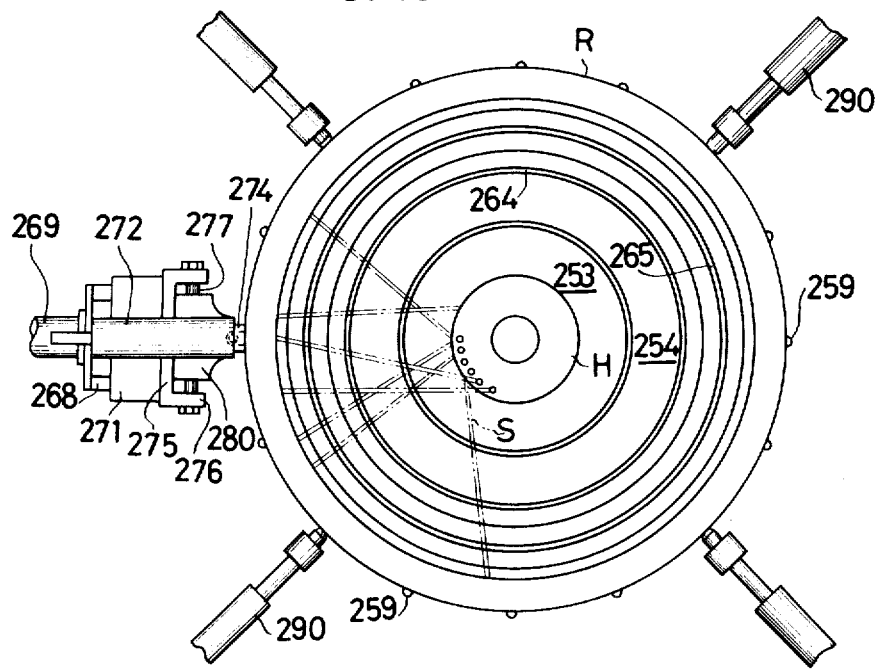

This feed unit 271 which may be moved back and forth relative to the rotary table 254, has a front surface facing the peripheral surface of the rotary table 254 provided with a reversible clyinder 280 (see FIGS. 48, 49, and 52) through a mounting member 275.

This mounting member 275 has a channel-shaped configuration (FIGS. 48, 49, and 52) in which opposite ends of an elongated plate are bended so as to parallel each other and form arms 276, and a piston rod 277, part of the reversible cylinder 280, is fixed between arms 276, with the reversible cylinder 280 also interposed between the arms 276.

This reversible cylinder 280 interposed between both arms 276 is of a dual piston construction, wherein one fixed piston 278 is secured to the piston rod 277 whereas a moving piston 279 is slidable with respect to the piston rod 277. The moving piston 279 is greater in diameter than that of the fixed piston 278 so that the former is moved only within a limited range in the stepped-reversible cylinder 280.

In this manner, the reversible cylinder 280 incorporates therein two pistons so that the reversible cylinder 280 may interiorly be divided into three cylinder chambers so that a pressurized supply of oil to the three cylinder chambers may be controlled to lock the reversible cylinder 280 at three accurate positions.

The reversible cylinder 280, horizontally movably mounted by the mounting member 275, has a front surface, which faces the outer peripheral surface of the rotary table 254. Said facing surface is integrally provided with a locking member 281 formed with a deep locking groove 282 therein so that an engaging pin 284 mounted in a vertical posture on a mounting member 283 secured to the outer peripheral surface of the rotary table 254 and facing the locking member 281 is brought into engagement with the locking groove 282 to thereby transmit the linear moving force of the reversible cylinder 280 to the rotary table 254 as a rotating force.

Also, the feed unit 271 has a front surface, which is facing the lower portion of the peripheral surface of the rotary table 254, provided with a releasing pin 285 protruded towards the rotary table 254, said releasing pin 285 being aligned to the upper end of a locking member 286 to provide a lock between the rotary table 254 and the index table 252 in order to disable rotation of the rotary table 254 relative to the index table 252.

The locking member 286 is pivotally mounted to a bracket 287 integral with the lower peripheral surface of the table 254 so that normally (when no external force is present), the locking member 286 is in engagement with a lock member 288, which is secured to the index table 252, by the action of a compression spring 289 retained between the upper end (in FIG. 48) of the locking member 286 and the peripheral surface of the rotary table 254 to thereby lock the rotary table 254 relative to the index table 252. When the releasing pin 285 presses the upper end of the locking member 286 against the spring 289 because of forward movement of the feed unit 271, the lower extremity of the locking member 286 is disengaged from the lock member 288 to render the rotary table 254 movable relative to the index table 252.

Moreover, the feed unit 271 is provided on its upper surface with a stop cylinder 272, which is aligned to a stop pin 266 secured to the aforementioned sliding ring 260 and protruded from the peripheral surface of the rotary table 254. Also an engaging piston 274 secured to the piston 273 of the stop cylinder 272 has its extremity formed with a recess in which the stop pin 266 is received, so that when the stop cylinder 272 is actuated to advance the engaging pin 274, the stop pin 266 is received into the extremity of the engaging pin 274 thereby preventing rotation of the sliding ring 260 simultaneously with the rotary table 254.

At the number 290, there is shown (FIG. 49) a plurality of nipple drivers in the fastening mechanism. The fastening mechanism further includes a pin for locating the rim R. Locating of the rim R in its angular orientation may be achieved via the opened hole, used as a reference through which air is later introduced to a tire, a correction drum for correcting the rim R which is often deformed when the latter is fixed on the peripheral ring portion 255 into a true circle, and the like though not shown in the figures.

Incidentally, the retaining drums 264, 265 (see FIG. 50) may be designed so that the low cylindrical bodies have their upper edges formed with a multitude of engaging grooves 264', 265', respectively, as previously described. However, all that need be done is to make an arrangement so that the retaining drum 264 retains spokes S which are inclined away from a radial orientation on one side while the retaining drum 265 retains spokes S inclined on the other side of a radius to the hub H.

When the retaining drum 264 or 265 is rotated in a condition where the hub H is fixed, the spokes S rotate together with the retaining drum 264 or 265 so as to vary the angle of inclination with the hub H and concurrently to vary the distance of the spoke S end with respect to the center axis of the hub H.

The operation of the instant second alternative mechanism is explained hereinafter.

Generally stated, the normal twilling posture of the spokes S fitted in the hub H is that the spoke's longitudinal axis is inclined at an angle of 40° away from a true radial position relative to the center axis of the hub H. The spoke receiving holes R' made in the rim R (FIG. 52) are also positioned as to align with the ends of spokes S at the spoke angle of inclination of 40°.

However, it should be noted that a 40° inclination is proper for a fully assembled wheel. If during assembly the spokes are twilled at a 40° inclination, there will be an interference fit and jamming between rim and spoke ends (as required deflection of spokes in the first embodiment). Therefore, during assembly, it is necessary to twill at an excessive angle which reduces the diameter of the circle formed by the twilled spoke ends and avoids interference with the rim.

It should be noted that this device of the second alternative embodiment is a spoke fastening mechanism. The hub H which is mounted on the surface of the base 253 is delivered to that location with spokes S attached thereto and already twilled at a 40° inclination.

To accomplish this non-interfering fit, the spokes S need to be inclined excessively by about 4° (which slightly differs depending upon the type of machine) more than the normal twilling angle of inclination thus ensuring that the ends of the spokes S fitted in the hub H are not caught in the inner peripheral edge of the rim R already immovably retained on the apparatus.

It will be appreciated that in fitting the hub H into the resting portion 253 that both the retaining drums 264 and 265 are preset at their rotational position to retain the spokes S at the normal 40° angle of inclination, and the spokes S twilled into a normal posture are retained in the engaging grooves 264' and 265' without modification for accomplishment of fitting of the hub H onto the resting portion 253. Then after the hub H is rested both the retaining drums 264 and 265 are rotated through the center angle of 4° in opposite directions to allow mounting of the rim R on the peripheral ring portion 255.

However, it should be noted that supplementary operations are frequently required on the rim R, e.g., forming a time circle, which operations are hindered by the presence of the spoked hub H. Consequently, if the hub H is delivered to the instant fastening apparatus with the spokes S already twilled to the excessive angle of 44°, then the rim may be put in place (and straightened, etc.) before the hub H is mounted.

Thus, the combination of the hub H and spokes S with the twilling angle of the spokes S excessively inclined is immovably fitted on the resting portion 253 by means of the retainer 257 with the center axis T of the hub H registered therewith; and at the same, the spokes S are placed in engagement with the corresponding engaging grooves 264' and 265' in the retaining drums 264 and 265.

In this case, the mounting position of the rim R relative to the retaining drum 264 is preset so that the ends of spokes S retained on one retaining drum (264 in the illustrated embodiment shown in FIG. 52) are aligned to the spoke receiving holes R' in the rim R.

Simultaneously with the operation of fitting the combination of the hub H and spokes S or prior to the entry of such operation, the feed cylinder 269 is actuated to advance the feed unit 271 positioned originally at the limit away from the axis T thereby allowing the engaging pin 284 to engage the locking groove 282 in the locking member 281; and at the same time, the top end of the locking member 286 is depressed by the releasing pin 285 to disengage the locking member 286 from the locking hook 288, thus allowing the rotary table 254 to rotate with respect to the index table 252.

Then, the stop cylinder 272 is actuated to advance the engaging pin 274 to allow it to engage the stop in 266, thereby immovably retaining the sliding ring 260.

Figure 52:
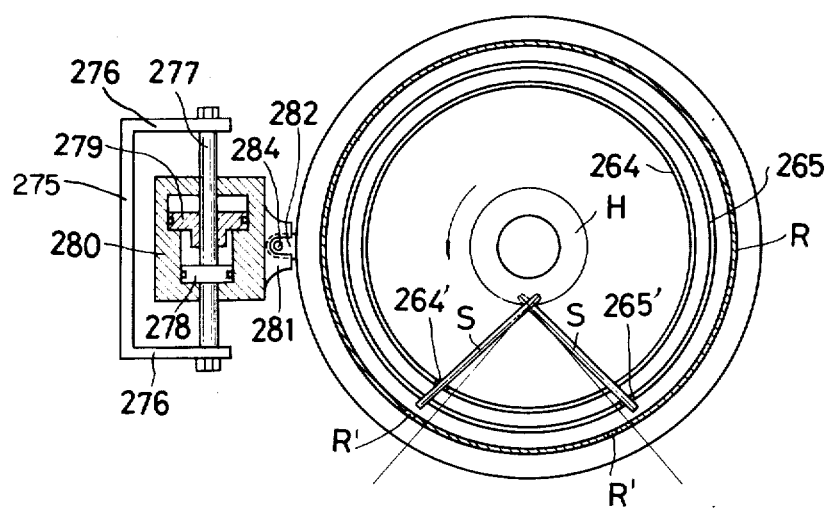

It is to be noted in this case that the reversible cylinder 280 is at one positional limit, i.e., the upper limit (FIG. 52).

Figure 53:
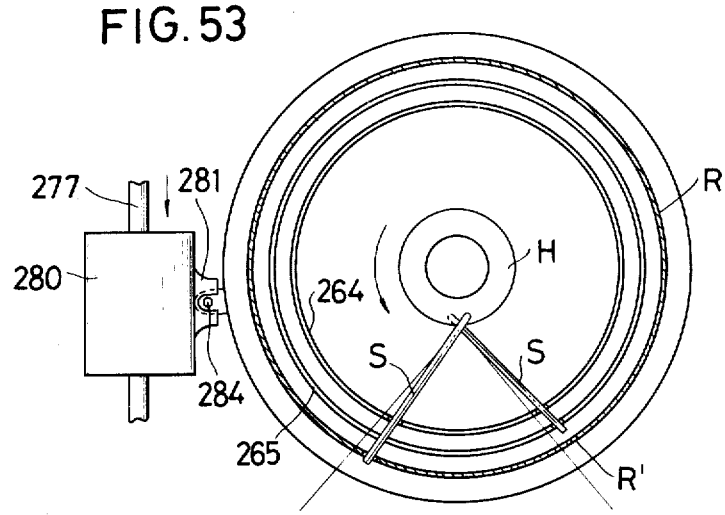

In the intial rotating operation (described immediately above) of the rotary table 254 from a state shown in FIG. 52 to a state shown in FIG. 53, the stop pin 266 remains in engagement with the engaging pin 274 so that the sliding ring 260 is not rotated at all; and hence, the spokes S retained on the retaining drum 265 mounted on the sliding ring 260 are not changed in their inclined posture.

When the reversible cylinder 280 has reached its forward limit (as shown in FIG. 53), the stop cylinder 272 is actuated to withdraw the engaging pin 274 from the stop pin 266, thus producing a condition where the sliding ring 260 can be rotated along with the rotary table 254.

Figure 54:
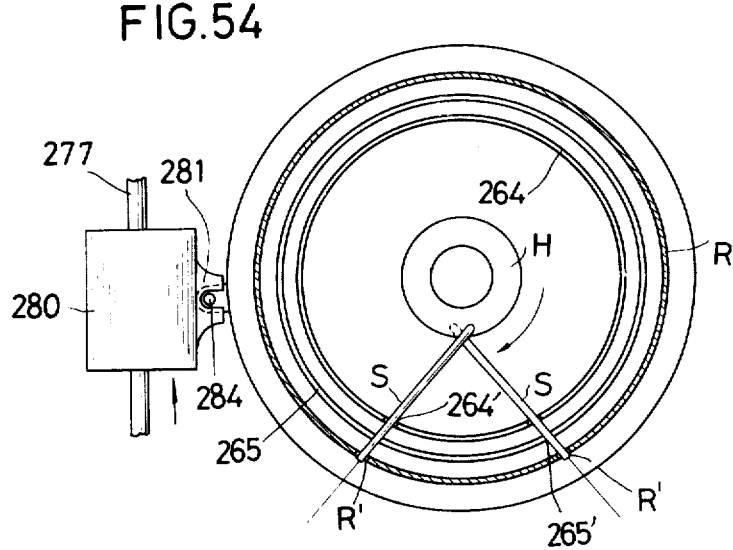

In this manner, after the engaging pin 274 has been disengaged from the stop pin 266, the reversible cylinder 280 is actuated to withdraw (move upward on FIG. 54) the reversible cylinder 280 to an intermediate position between the forward limit position (as shown in FIG. 53) and the rearward limit position (as shown in FIG. 52), thereby rotating and returning the rotary table 254 along with the both retaining drums 264, 265 and the rim R.

This rotating and returning angle of the rotary table 254 is equal to the excessively inclined angle (4°) of the spokes S retained on the retaining drum 265 so that the ends of the spokes S retained on the retaining drum 265 move into the spoke receiving holes R' by the desired length of entry amount, while the ends of the spokes S retained on the retaining drum 264 are withdrawn by the amount which they were excessively entered into the spoke receiving hole R' to assume the desired length of entry thereinto. Thus, all the spokes S are disposed in place with the ends thereof entered by the desired distance into the spoke receiving holes R', and at the requisite normal twilling inclined angle of 40°.

Briefly summarized, a spoke S which has been pivoted at its hub mounting point by an angle of 40° will have its free end substantially intersecting the inner peripheral surface of the rim R. When the spoke S is pivoted 44°, the free end will no longer reach the rim R;

when the spoke is pivoted only 36°, the locus of the free end extends beyond the aforementioned rim circle. Thus, at 36°, the spoke would join into the rim were it not for an aligned hole R' in the rim which receives the spoke end. This reception begins substantially at the 40° position of the spoke.

It must be remembered that (as seen in FIG. 52) spokes twilled to the left of a radial line from the hub center rest in grooves, e.g., at 264' on drum 264; and spokes twilled to the right of a radial line from the hub center rest in grooves, e.g., at 265' on drum 265.

The fastening operation begins with all spokes already twilled excessively to 44° and with the rim R oriented and held on the mounting 255 with receiving holes R' aligned to the spokes S in grooves 264' on the drum 264.

Now the rim R and the inner drum 264 with its spokes S are rotated counterclockwise so the spokes on drum 264, which were twilled at 44° are now at 36° and well inserted in the aligned receiving holes R', the insertion commencing approximately as the spokes reach the 40° position.

However, the hub H and the outer drum 265 with its spokes were not rotated during the above process so the spokes on drum 265 retain their 44° positions unchanged. But note that in moving the rim R by 8° (see FIG. 53) a set of rim holes R' have become aligned to the spokes S resting on outer drum 265. Now the relationship between rim holes R' and spokes S on drum 265 is exactly like the condition which existed for the spokes in drum 264 prior to the above-described 8° movement, i.e., the twilling angle is 44° and spokes on drum 265 are aligned with rim holes R'.

Finally a reverse motion of 4° (clockwise in FIG. 54) of the rim R and both drums 264, 265 wherein only the hub H remains stationary, will cause the spokes S from drum 265 to enter the rim holes R'. The entire process stops with each spoke twilled at the preferred 40° angle. It will be understood that the first motion is counterclockwise and the second motion is clockwise because as previously stated, the spokes S on drum 264 are twilled to the left of a radial position whereas the spokes S on the drum 265 are twilled to the right of a radial position.

In this manner, after the spokes S have been received into the spoke receiving holes R' in a normal inclined posture of 40°, the feed cylinder 269 is actuated to withdraw the feed unit 271 so that the rotary table 254 is again immovably locked with respect to the index table 252 to allow intermittent rotation of the rotary table 254 along with the index table 252, whereby the spokes S are coupled with the rim R by nipple-fastening using a fastening mechanism as is well known in the art.

After the spokes have been fastened, the wheel is released from the rim and hub retainers 257, 259 and the apparatus is returned to the starting conditions for receiving another hub and twilled spokes.

As described above, the instant mechanism provides an arrangement, wherein spokes S are excessively inclined by a fixed amount greater than a normal twilling angle of inclination in order to prevent ends of the spokes S from being jammed against the inner peripheral edge of a rim R; thereafter, the spokes S inclined in one direction and the rim R are totated integrally with respect to the hub H in a direction for restoring the excessively inclined angle of the spokes inclined in one direction but spokes S inclined in the other direction are immovably retained so that the spokes S may be received into opposed spoke receiving holes R' and at the same time the rotation of the spokes S and the rim R is continued until the spoke receiving holes R' in the rim R oppose to the spokes S inclined in the other direction, that is, such first rotation is made about the center axis T through an angle equalling two times the excess angle of the spokes S. Then, all of the spokes S and the rim R are integrally rotated in a direction for removing the excessive inclination of the spokes inclined in the other direction through a center angle equalling the excess angle thereof.

While a particular embodiment has been described using a rotary table 254, which is rotated twice in a manner such that the rotary table 254 is rotated in a fixed direction, after which it is rotated in a direction opposite to the former, it is to be understood according to principles of the instant invention that if all spokes S were excessively inclined in one direction from the normal twilling position, reception of all the spokes S into the spoke receiving holes R' can be achieved by rotation of the rotary table 254 in only one direction (however through a greater arc) combined with a revised sequence of drum movements.

It should further be noted that means for rotating the rotary table 254 with respect to the index table 252 or the hub H may be located within the rotary table 254 or within the index table 252 or independently of the combination of the index table 252 and the rotary table 254.

In disclosing all of the above embodiments, the controls for starting and stopping motors for actuating pistons and the types of piston deive, e.g., air, oil, linear motor have not been described in detail because of their conventionality and general usage in the mechanical and electrical arts. Also whereas the location of limit switches has been generally described above, their detailed operation in the overall method, e.g., to prevent further procedural steps and actuate an indicator device when a proper positioning of elements is not achieved in a sequence of events, has not been described in detail since their usage is well known and form no novel part of this invention. similarly, attachment of spokes with nipple fasteners is well known in the art and is neither described herein nor claimed as part of this invention.

As many apparently widely different embodiments of this invention may be made without departing from the spirit and scope thereof, it is to be understood that the invention is not limited to the specific embodiments thereof except as defined in the appended claims.

What is claimed:

1. Apparatus for inserting spokes in a wheel, said wheel including a hub having a plurality of holes, ech hole for pivotably receiving an individual spoke, a rim concentric with said hub having a plurality of rim holes, each hole to receive therethrough an individual spoke, and a plurality of spokes of extended length, one end of said spokes connecting to said hub, the other end of said spokes passing through said rim holes after said spokes have been twilled, comprising:

a support structure including:
(a) primary support means for retaining said hub with twilled spokes attached, the axis of rotation of said hub being vertical;
(b) spoke support means for retaining and supporting said twilled spokes near the other ends of said spokes away from said hub, said other ends of said spokes aligned to a single circle, said single circle being substantially of the same diameter as the inner circular surface of said rim;

(c) and deflection means for deflecting the middle section of said spokes while the opposite ends of said spokes are retained one end in said hub and said other end by said spoke support means;

(d) means for retaining said rim concentric with said axis of said hub, said rim having spoke receiving holes therein, said rim holes arranged in a circle on the inner circular surface of said rim, and each of said rim holes in said rim in substantial alignment with the other end of one of said spokes;

(e) and means for withdrawing said spoke deflection means whereby said spokes unflex and said other ends enter said rim holes; and (f) means for releasing said primary support means and said spoke support means, whereby a twilled arrangement of spokes on a hub have the remote other ends of the spokes retained while said spokes are flexed, the release of said flexure causing said other spoke ends to simultaneously enter and pass through said aligned rim holes to thereby ready said wheel for application of spoke fasteners.

2. Apparatus for assembling a wheel said wheel including a hub having a plurality of holes for pivotably receiving an individual spoke, a rim having a plurality of rim holes each hole to receive therethrough an individual spoke, and a plurality of spokes of extended length connecting said rim to said hub after said spokes have been twilled, comprising in combination;

(a) apparatus attached to a base structure for simultaneously drawing up said spokes comprising:

a rotatable support means for retaining said hub with said plurality of spokes pivotably attached, said hub having its rotational axis vertically oriented; motive means for rotating said support means and said attached hub about the axis of rotation of said hub; vertically translatable retaining means located concentric with and below said hub and said translatable means at its lowest vertical position not engaging said spokes, and said translatable means at its highest vertical position supporting said spokes from beneath when said spokes are horizontally and radially oriented relative to said axis of rotation of said hub, and said vertically translatable retaining means rotating in synchronism with said rotatable support with said hub immovably retained thereon; and means for translating said translatable retaining means;

(b) apparatus attached to said base structure for simultaneously twilling said spokes comprising:

main support means centrally located for retaining in a preferred position said hub with spokes attached, said main support means having a horizontal surface for receiving thereon said hub with the axis of rotation of said hub being vertical and with said spokes drawn up horizontally and radially extended;

a plurality of retainer pins distributed concentrically around said hub, said hub retained on said main support means, each of said retainer pins supporting and angularly constraining an individual one of said spokes, and each of said retainer pins bearing one of said spokes being rotatable horizontally about the axis of rotation of said hub;

and a means for rotating said retainer pins;

(c) apparatus attached to said base structure for simultaneously inserting said spokes comprising:

primary support means for retaining said hub with said twilled spokes attached, with the axis of rotation of said hub being vertical;

spoke support means for retaining and supporting said spokes after twilling near the far ends of said spokes away from said hub with the far ends of said spokes aligned to a single circle, said single circle being substantially of the same diameter as the inner circular surface of said rim;

deflection means for vertically deflecting the middle section of said spokes while the opposite ends of said spokes are retained one end in said hub and the other far end by said spoke support means;

means for retaining said rim concentric with said axis of said hub, said rim having spoke receiving holes therein, said spoke holes arranged in a circle on the inner circular surface of said rim, and each of said spoke holes in said rim in substantial alignment with one far end of one of said spokes;

means for withdrawing said spoke deflection means whereby said spokes unflex and said far ends enter said holes in said rim;

means for releasing said spoke support means; and (d) means attached to said base structure for fastening said spokes to said rim; and (e) first apparatus attached to said base structure for carrying a wheel hub with a plurality of spokes attached, said spokes being radially and horizontally drawn up, comprising:

means for retaining said hub from above and to lift and lower said hub;

means for horizontally translating said apparatus for carrying said wheel hub;

means for retaining said spokes in said drawn up position during vertical and horizontal movements of said apparatus with said hub retained; and (f) a second apparatus attached to said base structure for carrying a wheel hub with a plurality of spokes attached, said spokes being twilled and the far ends of said spokes being aligned to a single circle, comprising:

means for retaining said hub from above and to lift and lower said hub;

means for horizontally translating said apparatus for carrying said wheel hub;

whereby in said apparatuses said wheel is rotated to radially and horizontally extend said spokes, said extended spokes are retained and horizontally rotated relative to said hub and aligned to a rim circle, whereafter said spokes are deflected and released, said spokes, on release, entering and passing through aligned holes in said rim for fastening therein, and said carrying apparatuses move said hub, spokes and rim between operations.

3. The apparatus of claim 2 wherein said carrying apparatuses include a plurality of first elements movably positioned beneath said spokes and a plurality of second elements above said spokes, and each of said spokes retained between one of said first and one of said second elements, and means for reversibly positioning said first elements beneath said spokes.

4. The apparatus of claim 2 wherein the spoke support means of said fastening apparatus are the spoke retaining means of said second carrying apparatus.

5. The apparatus of claim 2 wherein said carrying means translate horizontally along said base structure.

6. An inserting apparatus for inserting twilled spokes pivotably attached to a stationary hub into a concentric rim, comprised of:
   a support structure including:
      means for holding said hub with said spokes in a preferred twilled posture relative to a radius drawn from the center of said hub;
      means for pivoting said spokes to a second posture excessively pivoted beyond said preferred posture;
      means for positioning said rim concentric to the axis of rotation of said hub, with spoke receiving holes in said rim aligned to said excessively pivoted spokes;
      means for rotating said rim in unison with said spokes in a direction whereby said spokes are returned at least to said preferred twilled posture, and whereby said spokes simultaneously enter through said holes in said rim thereby readying on assembled wheel for spoke fastening.

7. The apparatus of claim 6 further comprising an apparatus for drawing up and twilling spokes attached to said wheel hub including means for drawing up said spokes by rotation of said hub in combination with means for twilling said spokes, both said drawing up and said twilling means being concentrically oriented about the axis of rotation of said hub;
   means at an elevation above said twilling apparatus, for rotating said hub and for drawing up of said spokes;
   means after drawing up for vertically translating said hub and spokes into engagement with said twilling means.

* * * * *